United States Patent
Wang

(10) Patent No.: US 12,418,783 B2
(45) Date of Patent: Sep. 16, 2025

(54) UPGRADE METHOD AND APPARATUS BASED ON AN UPGRADE PACKAGE FROM A SERVER

(71) Applicant: SHENZHEN YINWANG INTELLIGENT TECHNOLOGIES CO., LTD., Shenzhen (CN)

(72) Inventor: Yong Wang, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 83 days.

(21) Appl. No.: 17/846,942

(22) Filed: Jun. 22, 2022

(65) Prior Publication Data

US 2022/0326938 A1 Oct. 13, 2022

Related U.S. Application Data

(63) Continuation of application No. PCT/CN2020/121269, filed on Oct. 15, 2020.

(30) Foreign Application Priority Data

Dec. 23, 2019 (CN) .......................... 201911342865.5

(51) Int. Cl.
  *G06F 8/65* (2018.01)
(52) U.S. Cl.
  CPC ...................... *G06F 8/65* (2013.01)
(58) Field of Classification Search
  CPC .................. G06F 8/65; H04L 67/34
  See application file for complete search history.

(56) References Cited

U.S. PATENT DOCUMENTS

| | | | |
|---|---|---|---|
| 2015/0020060 A1* | 1/2015 | Bandakka | G06F 8/61 |
| | | | 717/171 |
| 2015/0349977 A1 | 12/2015 | Risse et al. | |
| 2017/0315797 A1* | 11/2017 | Vangelov | H04L 67/12 |

(Continued)

FOREIGN PATENT DOCUMENTS

| | | | | |
|---|---|---|---|---|
| CN | 107040399 A | * | 8/2017 | ............... G06F 8/65 |
| CN | 108182072 A | | 6/2018 | |

(Continued)

OTHER PUBLICATIONS

Office Action in Japanese Appln. No. 2022-538331, mailed on Jun. 27, 2023, 5 pages (with English translation).

(Continued)

*Primary Examiner* — Qing Chen
(74) *Attorney, Agent, or Firm* — Fish & Richardson P.C.

(57) ABSTRACT

An upgrade method and an apparatus are provided, and relate to the field of internet of vehicles technologies. When a plurality of devices in an intelligent connected vehicle need to be upgraded, upgrade efficiency and a download speed can be improved, and a load and a storage requirement of a telematics box or a gateway can be reduced. The method includes: receiving upgrade information of a first apparatus from an over the air (OTA) node; establishing a first channel with a server based on the upgrade information of the first apparatus; receiving an upgrade package of the first apparatus from the server through the first channel; and performing upgrade based on the upgrade package of the first apparatus.

25 Claims, 7 Drawing Sheets

(56) References Cited

U.S. PATENT DOCUMENTS

| | | | |
|---|---|---|---|
| 2018/0013723 A1 | 1/2018 | Kirk et al. | |
| 2018/0018161 A1* | 1/2018 | Gattu | G06F 8/654 |
| 2018/0145991 A1* | 5/2018 | McCauley | H04L 9/0891 |
| 2018/0295486 A1* | 10/2018 | Brisebois | H04B 7/18526 |
| 2019/0187971 A1* | 6/2019 | Wang | H04W 12/06 |
| 2019/0268420 A1 | 8/2019 | Acharya et al. | |
| 2019/0354360 A1* | 11/2019 | Chim | H04L 67/34 |
| 2020/0177561 A1* | 6/2020 | Kruger | H04L 63/061 |

FOREIGN PATENT DOCUMENTS

| | | | | |
|---|---|---|---|---|
| CN | 108241500 A | | 7/2018 | |
| CN | 108984191 A | * | 12/2018 | |
| CN | 109189447 A | | 1/2019 | |
| CN | 110032382 A | | 7/2019 | |
| CN | 110378153 A | | 10/2019 | |
| JP | 2006313495 A | * | 11/2006 | G06F 21/62 |
| JP | 6376312 B1 | | 8/2018 | |
| WO | 2019083440 A2 | | 5/2019 | |

OTHER PUBLICATIONS

Extended European Search Report in European Appln No. 20907652.0, dated Dec. 12, 2022, 7 pages.
International Search Report and Written Opinion in International Appln. No. PCT/CN2020/121269, mailed on Jan. 18, 2021, 18 pages (with English translation).

* cited by examiner

UPGRADE METHOD AND APPARATUS BASED ON AN UPGRADE PACKAGE FROM A SERVER

CROSS-REFERENCE TO RELATED APPLICATIONS

This application is a continuation of International Application No. PCT/CN2020/121269, filed on Oct. 15, 2020, which claims priority to Chinese Patent Application No. 201911342865.5, filed on Dec. 23, 2019. The disclosures of the aforementioned applications are hereby incorporated by reference in their entireties.

TECHNICAL FIELD

This application relates to the field of internet of vehicles technologies, and in particular, to an upgrade method and an apparatus.

BACKGROUND

Over the air (OTA) is a technology for downloading data through a wireless network, and is currently widely used in software upgrade of devices such as smart TVs, mobile phones, tablet computers, or set-top boxes. With development of intelligent connected vehicles, OTA is also gradually applied in software upgrade of the intelligent connected vehicles. An original equipment manufacturer (OEM) upgrades related software or firmware of an intelligent connected vehicle through OTA, so that a quantity of times of vehicle recall can be reduced, operating costs of the manufacturer can be reduced, and a user requirement can be quickly responded to, so that user experience is improved.

The intelligent connected vehicle includes a plurality of devices, for example, a telematics box (T-box), a gateway, and an electronic control unit (ECU). When the plurality of devices in the intelligent connected vehicle need to be upgraded, a cloud (or a server) sends upgrade packages of the plurality of devices to the T-box or the gateway. The T-box or the gateway receives and verifies the upgrade packages of the plurality of devices, and sends the upgrade package of each device to a corresponding device after the verification succeeds. If the upgrade packages of the plurality of devices are relatively large, the T-box or the gateway not only consumes a relatively long time to download the upgrade packages of the plurality of devices, but also consumes relatively large storage space to store the upgrade packages of the plurality of devices. This increases a load and a storage requirement of the T-box or the gateway.

SUMMARY

Embodiments of this application provide an upgrade method and an apparatus, so that when a plurality of devices in an intelligent connected vehicle need to be upgraded, upgrade efficiency and a download speed can be improved, and a load and a storage requirement of a telematics box or a gateway can be reduced.

To achieve the foregoing objectives, the following technical solutions are used in the embodiments of this application.

According to a first aspect, an embodiment of this application provides an upgrade method. The method includes: receiving upgrade information of the first ECU from a telematics box or a gateway; establishing a first channel with a server based on the upgrade information of the first ECU; receiving an upgrade package of the first ECU from the server through the first channel; and performing upgrade based on the upgrade package of the first ECU.

According to the technical solution provided in the first aspect, when the first ECU needs to be upgraded, the first ECU may receive the upgrade information of the first ECU from the telematics box or the gateway, establish the first channel with the server based on the upgrade information of the first ECU, receive the upgrade package of the first ECU from the server through the first channel, and perform upgrade based on the upgrade package of the first ECU. In this way, the upgrade package of the first ECU may be not downloaded by the telematics box or the gateway. This can improve upgrade efficiency and a download speed, and reduce a load and a storage requirement of the telematics box or the gateway.

In a first possible implementation, the first channel is a transport layer security channel, a hypertext transfer protocol secure secure channel, or a datagram transport layer security secure channel. Based on the foregoing method, the first ECU may not download the upgrade package of the first ECU through the telematics box or the gateway, but downloads the upgrade package of the first ECU from the server through the transport layer security channel, the hypertext transfer protocol secure secure channel, or the datagram transport layer security secure channel. This improves upgrade efficiency and a download speed, and reduces a load and a storage requirement of the telematics box or the gateway.

In a possible implementation, the establishing a first channel with a server based on the upgrade information of the first ECU includes: sending first request information to the server, where the first request information is used to request to establish the first channel with the server; receiving first request response information from the server, where the first request response information is used to determine an encryption method for the server and the first ECU; sending first completion information to the server, where the first completion information is used to indicate that establishment of the first channel between the first ECU and the server is completed, and receiving first completion response information from the server, where the first completion response information is used to indicate that establishment of the first channel between the first ECU and the server is completed. Based on the foregoing method, the first ECU may send the first request information to the server, receive the first request response information from the server, send the first completion information to the server, and receive the first completion response information from the server to establish the first channel. Therefore, the first ECU may not download the upgrade package of the first ECU through the telematics box or the gateway, but downloads the upgrade package of the first ECU from the server through the first channel.

In a possible implementation, the upgrade information of the first ECU includes a download address of the upgrade package of the first ECU. Based on the foregoing method, the upgrade information of the first ECU includes the download address of the upgrade package of the first ECU. In this way, the first ECU may establish the first channel with the server based on the download address of the upgrade package of the first ECU. Therefore, the first ECU may not download the upgrade package of the first ECU through the telematics box or the gateway, but downloads the upgrade package of the first ECU from the server through the first channel.

In a possible implementation, the upgrade information of the first ECU includes indication information, and the indication information is used to indicate to upgrade the first ECU. Based on the foregoing method, the upgrade information of the first ECU includes the indication information. In this way, the first ECU may establish the first channel with the server based on the indication information. Therefore, the first ECU may not download the upgrade package of the first ECU through the telematics box or the gateway, but downloads the upgrade package of the first ECU from the server through the first channel.

In a possible implementation, the performing upgrade based on the upgrade package of the first ECU includes: after verification on a signature of the upgrade package of the first ECU succeeds, performing upgrade based on the upgrade package of the first ECU. Based on the foregoing method, after the verification on the signature of the upgrade package of the first ECU succeeds, the first ECU may perform upgrade based on the upgrade package of the first ECU, so as to ensure that the upgrade package of the first ECU is not tampered with.

According to a second aspect, an embodiment of this application provides an upgrade method. The method includes: receiving upgrade information of a plurality of devices from a server, where the upgrade information of the plurality of devices includes upgrade information of a first electronic control unit EC U. and the upgrade information of the first ECU is used to indicate the first ECU to establish a first channel with the server; and sending the upgrade information of the first ECU to the first ECU based on the upgrade information of the first ECU.

Based on the technical solution provided in the second aspect, the telematics box or the gateway may receive the upgrade information of the plurality of devices from the server, and send the upgrade information of the first ECU to the first ECU based on the upgrade information of the first ECU, so that the first ECU establishes the first channel with the server based on the upgrade information of the first ECU. Therefore, the first ECU may not download an upgrade package of the first ECU through the telematics box or the gateway, but downloads the upgrade package of the first ECU from the server through the first channel. This improves upgrade efficiency and a download speed, and reduces a load and a storage requirement of the telematics box or the gateway.

In a possible implementation, the first channel is a transport layer security channel, a hypertext transfer protocol secure secure channel, or a datagram transport layer security secure channel. Based on the foregoing solution, the telematics box or the gateway may send the upgrade information of the first ECU to the first ECU, so that the first ECU establishes the transport layer security channel, the hypertext transfer protocol secure secure channel, or the datagram transport layer security secure channel with the server based on the upgrade information of the first ECU. Therefore, the first ECU may not download an upgrade package of the first ECU through the telematics box or the gateway, but downloads the upgrade package of the first ECU from the server through the transport layer security channel, the hypertext transfer protocol secure secure channel, or the datagram transport layer security secure channel. This improves upgrade efficiency and a download speed, and reduces a load and a storage requirement of the telematics box or the gateway.

In a possible implementation, the upgrade information of the first ECU includes a download address of an upgrade package of the first ECU. Based on the foregoing solution, the telematics box or the gateway may send the download address of the upgrade package of the first ECU to the first ECU, so that the first ECU establishes the first channel with the server based on the download address of the upgrade package of the first ECU. Therefore, the first ECU may not download the upgrade package of the first ECU through the telematics box or the gateway, but downloads the upgrade package of the first ECU from the server through the first channel. This improves upgrade efficiency and a download speed, and reduces a load and a storage requirement of the telematics box or the gateway.

In a possible implementation, the upgrade information of the first ECU includes indication information, and the indication information is used to indicate to upgrade the first ECU. Based on the foregoing solution, the telematics box or the gateway may send the indication information to the first ECU, so that the first ECU establishes the first channel with the server based on the indication information. Therefore, the first ECU may not download the upgrade package of the first ECU through the telematics box or the gateway, but downloads the upgrade package of the first ECU from the server through the first channel. This improves upgrade efficiency and a download speed, and reduces a load and a storage requirement of the telematics box or the gateway.

In a possible implementation, the upgrade information of the plurality of devices further includes an upgrade package of a second ECU, and the method further includes: sending the upgrade package of the second ECU to the second ECU. Based on the foregoing method, the upgrade information of the plurality of devices further includes the upgrade package of the second ECU. In this way, the telematics box or the gateway may further send the upgrade package of the second ECU to the second ECU, so that the second ECU performs upgrade based on the upgrade package of the second ECU.

According to a third aspect, an embodiment of this application provides an upgrade method. The method includes, sending upgrade information of a plurality of devices to a telematics box or a gateway, where the upgrade information of the plurality of devices includes upgrade information of a first electronic control unit ECU; establishing a first channel with the first ECU based on the upgrade information of the first ECU; and sending an upgrade package of the first ECU to the first ECU through the first channel.

Based on the technical solution provided in the third aspect, a server may send the upgrade information of the first ECU to the telematics box or the gateway, to establish the first channel with the first ECU based on the upgrade information of the first ECU, and send the upgrade package of the first ECU to the first ECU through the first channel. Therefore, the first ECU may not download the upgrade package of the first ECU through the telematics box or the gateway, but downloads the upgrade package of the first ECU from the server through the first channel. This improves upgrade efficiency and a download speed, and reduces a load and a storage requirement of the telematics box or the gateway.

In a possible implementation, the first channel is a transport layer security channel, a hypertext transfer protocol secure secure channel, or a datagram transport layer security secure channel. Based on the foregoing method, the server may establish the transport layer security channel, the hypertext transfer protocol secure secure channel, or the datagram transport layer security secure channel with the first ECU based on the upgrade information of the first ECU. Therefore, the first ECU may not download the upgrade package of the first ECU through the telematics box or the gateway, but downloads the upgrade package of the first ECU from the server through the transport layer security channel, the hypertext transfer protocol secure secure channel, or the datagram transport layer security secure channel. This improves upgrade efficiency and a download speed, and reduces a load and a storage requirement of the telematics box or the gateway.

In a possible implementation, the establishing a first channel with the first ECU based on the upgrade information of the first ECU includes: receiving first request information from the first ECU, where the first request information is used to request to establish the first channel with the server; sending first request response information to the first ECU based on the first request information, where the first request response information is used to determine an encryption method for the server and the first ECU; receiving first completion information from the first ECU, where the first completion information is used to indicate that establishment of the first channel between the first ECU and the server is completed; and sending first completion response information to the first ECU based on the first completion information, where the first completion response information is used to indicate that establishment of the first channel between the first ECU and the server is completed. Based on the foregoing method, the server may receive the first request information from the first ECU, send the first request response information to the first ECU based on the first request information, receive the first completion information from the first ECU, and send the first completion response information to the first ECU based on the first completion information to establish the first channel. Therefore, the first ECU may not download the upgrade package of the first ECU through the telematics box or the gateway, but downloads the upgrade package of the first ECU from the server through the transport layer security channel, the hypertext transfer protocol secure secure channel, or the datagram transport layer security secure channel. This improves upgrade efficiency and a download speed, and reduces a load and a storage requirement of the telematics box or the gateway.

In a possible implementation, the upgrade information of the first ECU includes a download address of an upgrade package of the first ECU. Based on the foregoing method, the server may establish the first channel with the first ECU based on the download address of the upgrade package of the first ECU. Therefore, the first ECU may not download the upgrade package of the first ECU through the telematics box or the gateway, but downloads the upgrade package of the first ECU from the server through the transport layer security channel, the hypertext transfer protocol secure secure channel, or the datagram transport layer security secure channel. This improves upgrade efficiency and a download speed, and reduces a load and a storage requirement of the telematics box or the gateway.

In a possible implementation, the upgrade information of the first ECU includes indication information, and the indication information is used to indicate to upgrade the first ECU. Based on the foregoing method, the server may establish the first channel with the first ECU based on the indication information. Therefore, the first ECU may not download the upgrade package of the first ECU through the telematics box or the gateway, but downloads the upgrade package of the first ECU from the server through the transport layer security channel, the hypertext transfer protocol secure secure channel, or the datagram transport layer security secure channel. This improves upgrade efficiency and a download speed, and reduces a load and a storage requirement of the telematics box or the gateway.

In a possible implementation, the method further includes: signing the upgrade package of the first ECU. Based on the foregoing method, the server may sign the upgrade package of the first ECU, so that after receiving the upgrade package of the first ECU, the first ECU can verify whether the upgrade package of the first ECU is tampered with. This ensures upgrade security of the first ECU.

In a possible implementation, the upgrade information of the plurality of devices further includes an upgrade package of a second ECU. Based on the foregoing method, the server may further send the upgrade package of the second ECU to the telematics box or the gateway, so that the telematics box or the gateway assists in upgrading the second ECU.

According to a fourth aspect, an embodiment of this application provides a communications apparatus. The communications apparatus has a function of implementing the method in the first aspect. The function may be implemented by hardware, or may be implemented by hardware executing corresponding software. The hardware or the software includes one or more modules corresponding to the function.

According to a fifth aspect, an embodiment of this application provides a communications apparatus. The communications apparatus has a function of implementing the method in the second aspect. The function may be implemented by hardware, or may be implemented by hardware executing corresponding software. The hardware or the software includes one or more modules corresponding to the function.

According to a sixth aspect, an embodiment of this application provides a communications apparatus. The communications apparatus has a function of implementing the method in the third aspect. The function may be implemented by hardware, or may be implemented by hardware executing corresponding software. The hardware or the software includes one or more modules corresponding to the function.

According to a seventh aspect, an embodiment of this application provides a communications apparatus, including at least one processor, at least one memory, and a communications interface. The communications interface, the at least one memory, and the at least one processor are coupled. The communications apparatus communicates with another device through the communications interface. The at least one memory is configured to store a computer program, so that when the computer program is executed by the at least one processor, the upgrade method in the first aspect and the possible implementations of the first aspect is implemented.

According to an eighth aspect, an embodiment of this application provides a communications apparatus, including at least one processor, at least one memory, and a communications interface. The communications interface, the at least one memory, and the at least one processor are coupled. The communications apparatus communicates with another device through the communications interface. The at least one memory is configured to store a computer program, so that when the computer program is executed by the at least one processor, the upgrade method in the second aspect and the possible implementations of the second aspect is implemented.

According to a ninth aspect, an embodiment of this application provides a communications apparatus, including at least one processor, at least one memory, and a communications interface. The communications interface, the at least one memory, and the at least one processor are coupled. The communications apparatus communicates with another device through the communications interface. The at least one memory is configured to store a computer program, so that when the computer program is executed by the at least one processor, the upgrade method in the third aspect and the possible implementations of the third aspect is implemented.

According to a tenth aspect, this application provides a system chip. The system chip may be used in a communications apparatus. The system chip includes at least one processor. Related program instructions are executed by the at least one processor, to implement a function of the first ECU in the method in any one of the first aspect and the designs of the first aspect. Optionally, the system chip may further include at least one memory. The memory stores the related program instructions.

According to an eleventh aspect, this application provides a system chip. The system chip may be used in a communications apparatus. The system chip includes at least one processor. Related program instructions are executed by the at least one processor, to implement a function of the telematics box or the gateway in the method in any one of the second aspect and the designs of the second aspect. Optionally, the system chip may further include at least one memory. The memory stores the related program instructions.

According to a twelfth aspect, this application provides a system chip. The system chip may be used in a communications apparatus. The system chip includes at least one processor. Related program instructions are executed by the at least one processor, to implement a function of the server in the method in any one of the third aspect and the designs of the third aspect. Optionally, the system chip may further include at least one memory. The memory stores the related program instructions.

According to a thirteenth aspect, an embodiment of this application provides a computer-readable storage medium, for example, a non-transient computer-readable storage medium. The computer-readable storage medium stores a computer program. When the computer program is run on a computer, the computer is enabled to perform any possible method in the first aspect. For example, the computer may be at least one storage node.

According to a fourteenth aspect, an embodiment of this application provides a computer-readable storage medium, for example, a non-transient computer-readable storage medium. The computer-readable storage medium stores a computer program. When the computer program is run on a computer, the computer is enabled to perform any possible method in the second aspect. For example, the computer may be at least one storage node.

According to a fifteenth aspect, an embodiment of this application provides a computer-readable storage medium, for example, a non-transient computer-readable storage medium. The computer-readable storage medium stores a computer program. When the computer program is run on a computer, the computer is enabled to perform any possible method in the third aspect. For example, the computer may be at least one storage node.

According to a sixteenth aspect, an embodiment of this application provides a computer program product. When the computer program product is run on a computer, any method provided in the first aspect is enabled to be performed. For example, the computer may be at least one storage node.

According to a seventeenth aspect, an embodiment of this application provides a computer program product. When the computer program product is run on a computer, any method provided in the second aspect is enabled to be performed. For example, the computer may be at least one storage node.

According to an eighteenth aspect, an embodiment of this application provides a computer program product. When the computer program product is run on a computer, any method provided in the third aspect is enabled to be performed. For example, the computer may be at least one storage node.

According to a nineteenth aspect, an embodiment of this application provides an upgrade system. The upgrade system may include any one or more of the following: the communications apparatus in the fourth aspect, the communications apparatus in the fifth aspect, the communications apparatus in the sixth aspect, the communications apparatus in the seventh aspect, the communications apparatus in the eighth aspect, the communications apparatus in the ninth aspect, the system chip in the tenth aspect, the system chip in the eleventh aspect, the system chip in the twelfth aspect, the computer-readable storage medium in the thirteenth aspect, the computer-readable storage medium in the fourteenth aspect, the computer-readable storage medium in the fifteenth aspect, the computer program product in the sixteenth aspect, the computer program product in the seventeenth aspect, or the computer program product in the eighteenth aspect.

It may be understood that any communications apparatus, system chip, computer-readable storage medium, computer program product, upgrade system, or the like provided above is configured to perform a corresponding method provided above. Therefore, for beneficial effects that can be achieved, refer to beneficial effects in the corresponding method. Details are not described herein.

According to a twentieth aspect, an embodiment of this application provides an upgrade method. The method is applied to a first apparatus, and the method includes: receiving upgrade information of the first apparatus from an OTA node; establishing a first channel with a server based on the upgrade information of the first apparatus; receiving an upgrade package of the first apparatus from the server through the first channel; and performing upgrade based on the upgrade package of the first apparatus.

In a possible implementation, the first channel is a transport layer security channel, a hypertext transfer protocol secure secure channel, or a datagram transport layer security secure channel.

In a possible implementation, the establishing a first channel with a server based on the upgrade information of the first apparatus includes: sending first request information to the server, where the first request information is used to request to establish the first channel with the server; receiving first request response information from the server, where the first request response information is used to determine an encryption method for the server and the first apparatus; sending first completion information to the server, where the first completion information is used to indicate that establishment of the first channel between the first apparatus and the server is completed; and receiving first completion response information from the server, where the first completion response information is used to indicate that establishment of the first channel between the first apparatus and the server is completed.

In a possible implementation, the upgrade information of the first apparatus includes a download address of the upgrade package of the first apparatus.

In a possible implementation, the upgrade information of the first apparatus includes indication information, and the indication information is used to indicate to upgrade the first apparatus.

In a possible implementation, the performing upgrade based on the upgrade package of the first apparatus includes:

after verification on a signature of the upgrade package of the first apparatus succeeds, performing upgrade based on the upgrade package of the first apparatus.

In a possible implementation, the first apparatus is an electronic control unit ECU, a gateway, a domain controller, or a telematics box.

In a possible implementation, an OTA node is deployed on the first apparatus, or no OTA node is deployed on the first apparatus.

According to a twenty-first aspect, an embodiment of this application provides an upgrade method. The method is applied to an OTA node, and the method includes: receiving upgrade information of a plurality of devices from a server, where the upgrade information of the plurality of devices includes upgrade information of a first apparatus, and the upgrade information of the first apparatus is used to indicate the first apparatus to establish a first channel with the server; and sending the upgrade information of the first apparatus to the first apparatus based on the upgrade information of the first apparatus.

In a possible implementation, the first channel is a transport layer security channel, a hypertext transfer protocol secure secure channel, or a datagram transport layer security secure channel.

In a possible implementation, the upgrade information of the first apparatus includes a download address of an upgrade package of the first apparatus.

In a possible implementation, the upgrade information of the first apparatus includes indication information, and the indication information is used to indicate to upgrade the first apparatus.

In a possible implementation, the upgrade information of the plurality of devices further includes an upgrade package of a second apparatus, and the method further includes: sending the upgrade package of the second apparatus to the second apparatus.

In a possible implementation, the first apparatus is an electronic control unit ECU, a gateway, a domain controller, or a telematics box.

In a possible implementation, the second apparatus is different from the first apparatus, and the second apparatus is an electronic control unit ECU, a gateway, a domain controller, or a telematics box.

In a possible implementation, an OTA node is deployed on the first apparatus, or no OTA node is deployed on the first apparatus.

In a possible implementation, an OTA node is deployed on the second apparatus, or no OTA node is deployed on the second apparatus.

According to a twenty-second aspect, an embodiment of this application provides an upgrade method. The method is applied to a server, and the method includes: sending upgrade information of a plurality of devices to an OTA node, where the upgrade information of the plurality of devices includes upgrade information of a first apparatus; establishing a first channel with the first apparatus based on the upgrade information of the first apparatus; and sending an upgrade package of the first apparatus to the first apparatus through the first channel.

In a possible implementation, the first channel is a transport layer security channel, a hypertext transfer protocol secure secure channel, or a datagram transport layer security secure channel.

In a possible implementation, the establishing a first channel with the first apparatus based on the upgrade information of the first apparatus includes: receiving first request information from the first apparatus, where the first request information is used to request to establish the first channel with the server; sending first request response information to the first apparatus based on the first request information, where the first request response information is used to determine an encryption method for the server and the first apparatus; receiving first completion information from the first apparatus, where the first completion information is used to indicate that establishment of the first channel between the first apparatus and the server is completed; and sending first completion response information to the first apparatus based on the first completion information, where the first completion response information is used to indicate that establishment of the first channel between the first apparatus and the server is completed.

In a possible implementation, the upgrade information of the first apparatus includes a download address of the upgrade package of the first apparatus.

In a possible implementation, the upgrade information of the first apparatus includes indication information, and the indication information is used to indicate to upgrade the first apparatus.

In a possible implementation, the method further includes, signing the upgrade package of the first apparatus.

In a possible implementation, the upgrade information of the plurality of devices further includes an upgrade package of a second apparatus.

In a possible implementation, the first apparatus is an electronic control unit ECU, a gateway, a domain controller, or a telematics box.

In a possible implementation, the second apparatus is different from the first apparatus, and the second apparatus is an electronic control unit ECU, a gateway, a domain controller, or a telematics box.

In a possible implementation, an OTA node is deployed on the first apparatus, or no OTA node is deployed on the first apparatus.

In a possible implementation, an OTA node is deployed on the second apparatus, or no OTA node is deployed on the second apparatus.

According to a twenty-third aspect, an embodiment of this application provides a communications apparatus. The communications apparatus has a function of implementing the method in the twentieth aspect. The function may be implemented by hardware, or may be implemented by hardware executing corresponding software. The hardware or the software includes one or more modules corresponding to the function.

According to a twenty-fourth aspect, an embodiment of this application provides a communications apparatus. The communications apparatus has a function of implementing the method in the twenty-first aspect. The function may be implemented by hardware, or may be implemented by hardware executing corresponding software. The hardware or the software includes one or more modules corresponding to the function.

According to a twenty-fifth aspect, an embodiment of this application provides a communications apparatus. The communications apparatus has a function of implementing the method in the twenty-second aspect. The function may be implemented by hardware, or may be implemented by hardware executing corresponding software. The hardware or the software includes one or more modules corresponding to the function.

According to a twenty-sixth aspect, an embodiment of this application provides a communications apparatus, including at least one processor, at least one memory, and a communications interface. The communications interface, the at least one memory, and the at least one processor are coupled. The communications apparatus communicates with another device through the communications interface. The at least one memory is configured to store a computer program, so that when the computer program is executed by the at least one processor, the upgrade method in the twentieth aspect and the possible implementations of the twentieth aspect is implemented.

According to a twenty-seventh aspect, an embodiment of this application provides a communications apparatus, including at least one processor, at least one memory, and a communications interface. The communications interface, the at least one memory, and the at least one processor are coupled. The communications apparatus communicates with another device through the communications interface. The at least one memory is configured to store a computer program, so that when the computer program is executed by the at least one processor, the upgrade method in the twenty-first aspect and the possible implementations of the twenty-first aspect is implemented.

According to a twenty-eighth aspect, an embodiment of this application provides a communications apparatus, including at least one processor, at least one memory, and a communications interface. The communications interface, the at least one memory, and the at least one processor are coupled. The communications apparatus communicates with another device through the communications interface. The at least one memory is configured to store a computer program, so that when the computer program is executed by the at least one processor, the upgrade method in the twenty-second aspect and the possible implementations of the twenty-second aspect is implemented.

According to a twenty-ninth aspect, this application provides a system chip. The system chip may be used in a communications apparatus. The system chip includes at least one processor. Related program instructions are executed by the at least one processor, to implement a function of the first ECU in the method in any one of the twentieth aspect and the designs of the twentieth aspect. Optionally, the system chip may further include at least one memory. The memory stores the related program instructions.

According to a thirtieth aspect, this application provides a system chip. The system chip may be used in a communications apparatus. The system chip includes at least one processor. Related program instructions are executed by the at least one processor, to implement a function of the telematics box or the gateway in the method in any one of the twenty-first aspect and the designs of the twenty-first aspect. Optionally, the system chip may further include at least one memory. The memory stores the related program instructions.

According to a thirty-first aspect, this application provides a system chip. The system chip may be used in a communications apparatus. The system chip includes at least one processor. Related program instructions are executed by the at least one processor, to implement a function of the server in the method in any one of the twenty-second aspect and the designs of the twenty-second aspect. Optionally, the system chip may further include at least one memory. The memory stores the related program instructions.

According to a thirty-second aspect, an embodiment of this application provides a computer-readable storage medium, for example, a non-transient computer-readable storage medium. The computer-readable storage medium stores a computer program. When the computer program is run on a computer, the computer is enabled to perform any possible method in the twentieth aspect. For example, the computer may be at least one storage node.

According to a thirty-third aspect, an embodiment of this application provides a computer-readable storage medium, for example, a non-transient computer-readable storage medium. The computer-readable storage medium stores a computer program. When the computer program is run on a computer, the computer is enabled to perform any possible method in the twenty-first aspect. For example, the computer may be at least one storage node.

According to a thirty-fourth aspect, an embodiment of this application provides a computer-readable storage medium, for example, a non-transient computer-readable storage medium. The computer-readable storage medium stores a computer program. When the computer program is run on a computer, the computer is enabled to perform any possible method in the twenty-second aspect. For example, the computer may be at least one storage node.

According to a thirty-fifth aspect, an embodiment of this application provides a computer program product. When the computer program product is run on a computer, any method provided in the twentieth aspect is enabled to be performed. For example, the computer may be at least one storage node.

According to a thirty-sixth aspect, an embodiment of this application provides a computer program product. When the computer program product is run on a computer, any method provided in the twenty-first aspect is enabled to be performed. For example, the computer may be at least one storage node.

According to a thirty-seventh aspect, an embodiment of this application provides a computer program product. When the computer program product is run on a computer, any method provided in the twenty-second aspect is enabled to be performed. For example, the computer may be at least one storage node.

According to a thirty-eighth aspect, an embodiment of this application provides an upgrade system. The upgrade system may include any one or more of the following: the communications apparatus in the twenty-third aspect, the communications apparatus in the twenty-fourth aspect, the communications apparatus in the twenty-fifth aspect, the communications apparatus in the twenty-sixth aspect, the communications apparatus in the twenty-seventh aspect, the communications apparatus in the twenty-eighth aspect, the system chip in the twenty-ninth aspect, the system chip in the thirtieth aspect, the system chip in the thirty-first aspect, the computer-readable storage medium in the thirty-second aspect, the computer-readable storage medium in the thirty-third aspect, the computer-readable storage medium in the thirty-fourth aspect, the computer program product in the thirty-fifth aspect, the computer program product in the thirty-sixth aspect, or the computer program product in the thirty-seventh aspect.

It may be understood that any communications apparatus, system chip, computer-readable storage medium, computer program product, upgrade system, or the like provided above is configured to perform a corresponding method provided above. Therefore, for beneficial effects that can be achieved, refer to beneficial effects in the corresponding method. Details are not described herein.

DESCRIPTION OF EMBODIMENTS

The following describes implementations of the embodiments of this application in detail with reference to accompanying drawings.

Figure 1A:
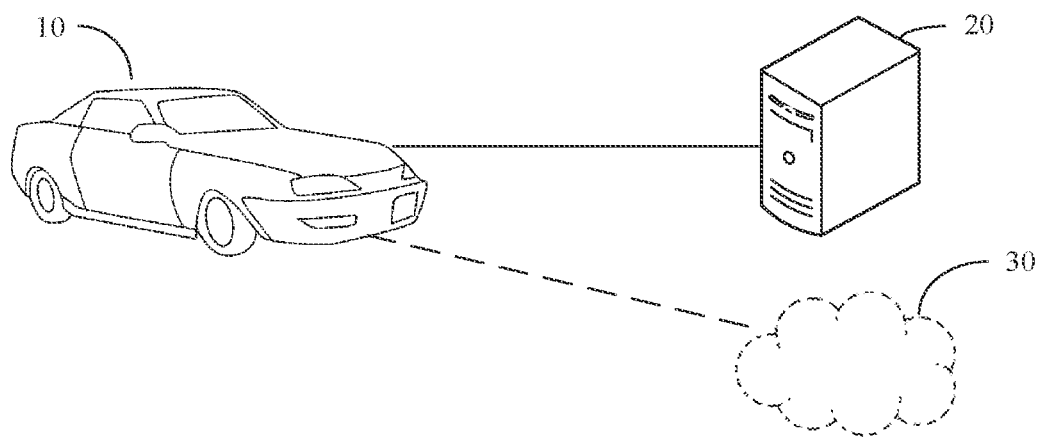
FIG. 1A is a schematic diagram of an architecture of an upgrade system according to an embodiment of this application.

FIG. 1A is a schematic diagram of an architecture of an upgrade system according to an embodiment of this application. In FIG. 1A, the upgrade system may include a vehicle 10 and a server 20 (or a cloud 30).

In FIG. 1A, the vehicle 10 may be an intelligent connected vehicle. The vehicle 10 may include a plurality of devices. For example, the vehicle 10 may include devices such as a T-Box, a gateway, and an ECU. Specifically, an architecture of the vehicle 10 may be shown in FIG. 1B.

Figure 1B:
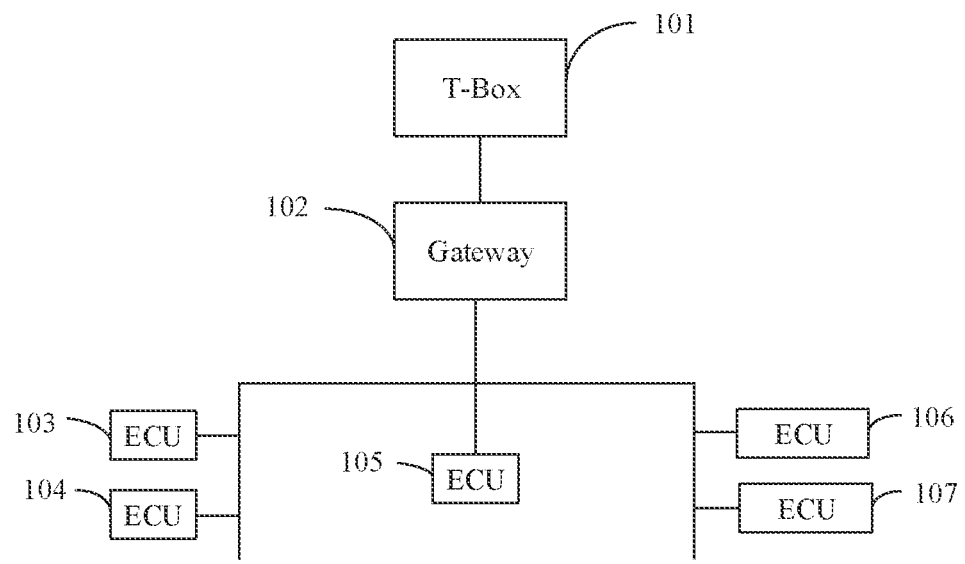
FIG. 1B is a schematic diagram of an architecture of a vehicle according to an embodiment of this application.

FIG. 1B is a schematic diagram of an architecture of a vehicle 10 according to an embodiment of this application. As shown in FIG. 1B, the vehicle 10 may include a T-Box 101, a gateway 102, and an ECU 103 to an ECU 107.

The T-Box 101 and the gateway 102 may be connected by using an Ethernet. The gateway 102 and the ECU may be connected through the Ethernet, a controller area network (CAN), a local interconnect network (LIN), media oriented system transport (MOST), or FlexRay. For example, the gateway 102 may be connected to the ECU 103 through the CAN, and the gateway 102 may be connected to the ECU 105 through the LIN.

In FIG. 1B, the T-Box 101 may have a capability of communicating with an external device in the vehicle 10 and an internal device in the vehicle 10. The external device in the vehicle 10 may be described as a device outside the vehicle 10, for example, the server 20 or the cloud 30 in FIG. 1A, or a terminal device (not shown in FIG. 1A) of a user. The internal device in the vehicle 10 may be a device shown in FIG. 1B, for example, the gateway 102 or the ECU 103.

In FIG. 1B, the T-Box 101 communicates with the internal device in the vehicle 10, and may be configured to send information to the internal device in the vehicle 10. For example, the T-Box 101 sends upgrade information of a plurality of devices to the gateway 102. The T-Box 101 communicates with the external device in the vehicle 10, and may be configured to receive information from the server 20 or the cloud 30. For example, the T-Box 101 may be configured to receive upgrade information of a plurality of devices from the server 20 or the cloud 30.

In some embodiments, the T-Box 101 may further have a capability of coordinating upgrades of the internal devices in the vehicle 10. For example, the upgrade information of the plurality of devices includes upgrade information of the ECU 103 and upgrade information of the ECU 105. The T-Box 101 may receive the upgrade information of the plurality of devices from the server 20, and verify the upgrade information of the plurality of devices. After the verification succeeds, the T-Box 101 sends the upgrade information of the ECU 103 to the ECU 103 through the gateway 102, and sends the upgrade information of the ECU 105 to the ECU 105 through the gateway 102.

In FIG. 1B, the gateway 102 is a core component of the vehicle 10, and the gateway 102 may route network data such as the CAN, the LIN, the MOST, or the FlexRay in different networks. For example, the gateway 102 may receive the upgrade information of the ECU 103 from the T-Box 101, and send the upgrade information of the ECU 103 to the ECU 103.

In some embodiments, the gateway 102 may further have a capability of coordinating upgrades of the internal devices in the vehicle 10. For example, the upgrade information of the plurality of devices includes upgrade information of the ECU 106 and upgrade information of the ECU 105. The gateway 102 may receive the upgrade information of the plurality of devices from the T-Box 101, and verify the upgrade information of the plurality of devices. After the verification succeeds, the gateway 102 sends the upgrade information of the ECU 106 to the ECU 106, and sends the upgrade information of the ECU 105 to the ECU 105.

In FIG. 1B, the ECU may be a micro-computer controller of the vehicle 10, and may have a capability of executing a preset control function. For example, the ECU 104 may be configured to control an engine to run, and the ECU 103 may be configured to protect vehicle safety.

In some embodiments, the ECU in FIG. 1B may alternatively be an autonomous driving-related device. For example, the ECU 105 may be a mobile data center (MDC), and the ECU 107 may be a human-machine interaction (HMI) device. The MDC may be an intelligent onboard computing platform of the vehicle 10. The HMI may be an information entertainment system of the vehicle 10.

In some embodiments, an OTA node may be deployed on the device in the vehicle 10 (for example, the T-Box 101, the gateway 102, or the ECU 103 to the ECU 107). The OTA node may also be referred to as an OTA master or an OTA manager. The device on which the OTA node is deployed may have a capability of coordinating upgrades of the internal devices in the vehicle 10. For example, an OTA node is deployed on the ECU 103, and the upgrade information of the plurality of devices includes upgrade information of the ECU 106 and upgrade information of the ECU 105. The ECU 103 may receive the upgrade information of the plurality of devices from the server 20 (the ECU 103 may directly receive the upgrade information of the plurality of devices from the server 20, or may receive the upgrade information of the plurality of devices from the server 20 through the T-Box 101), and verifies the upgrade information of the plurality of devices. After the verification succeeds, the ECU 103 sends the upgrade information of the ECU 106 to the ECU 106, and sends the upgrade information of the ECU 105 to the ECU 105.

It may be understood that an OTA node may alternatively be deployed on a domain controller (not shown in FIG. 1B)

or a vehicle integrated unit (vehicle integration unit, VIU). The domain controller may classify the devices in the vehicle into a plurality of domains according to a function, and manage each domain. A plurality of VIUs can form a ring network to achieve a high bandwidth (which may be specifically embodied as a high-definition camera, a high-definition display, or the like), a low latency, and a high-reliability processing capability. In addition, the ring network may further simplify configuration of an in-vehicle network, and improve upgrade and maintenance efficiency.

It may be understood that an OTA node may alternatively be independently deployed in the vehicle 10. In other words, the OTA node may be deployed in the vehicle 10 independently of devices such as the T-Box 101, the gateway 102, and the ECU 103 to the ECU 107, and may communicate with the devices such as the T-Box 101, the gateway 102, and the ECU 103 to the ECU 107.

It may be understood that, if an OTA node is deployed on a device in a vehicle, an execution body on a vehicle side in the embodiments of this application is the device, or if an OTA node is independently deployed in a vehicle, an execution body on a vehicle side in the embodiments of this application is the OTA node. The following embodiments of this application are described by using an example in which an OTA node is deployed on a T-Box or a gateway, a first apparatus is a first ECU, and a second apparatus is a second ECU. The OTA node is independently deployed, or the OTA node is deployed on a device other than the T-Box or the gateway. For details, refer to the case in which the OTA node is deployed on the T-Box or the gateway.

It should be understood that the architecture of the vehicle 10 shown in FIG. 1B is merely used as an example, but is not intended to limit the technical solutions of this application. A person skilled in the art should understand that, in a specific implementation process, the vehicle 10 may further include another device, for example, an on-board diagnostics (OBD) system or a domain controller. In addition, quantities of gateways, domain controllers, and ECUs may also be determined based on a specific requirement.

The server 20 or the cloud 30 in FIG. 1A may have a capability of discovering upgrade information of a device in the vehicle 10 and indicating to upgrade the device in the vehicle 10. For example, when discovering upgrade information of a plurality of devices in the vehicle 10, the server 20 may send the upgrade information of the plurality of devices to the vehicle 10.

The server 20 or the cloud 30 in FIG. 1A may further have a capability of providing a service for a device in the vehicle 10. For example, if the ECU 106 is used for navigation, the server 20 or the cloud 30 may provide a navigation service for the ECU 106.

It should be understood that the upgrade system shown in FIG. 1A is merely used as an example, but is not intended to limit the technical solutions of this application. A person skilled in the art should understand that, in a specific implementation process, the upgrade system may further include another device, and a quantity of vehicles 10, servers 20, or clouds 30 may also be determined based on a specific requirement. This is not limited.

Optionally, each device in FIG. 1B in the embodiments of this application, for example, the server 20, the cloud 30, the T-Box 101, the gateway 102, or the ECU 106, may be a function module in a device. It may be understood that the function module may be an element in a hardware device, a software function running on dedicated hardware, or a virtualized function instantiated on a platform (for example, a cloud platform).

Figure 2:
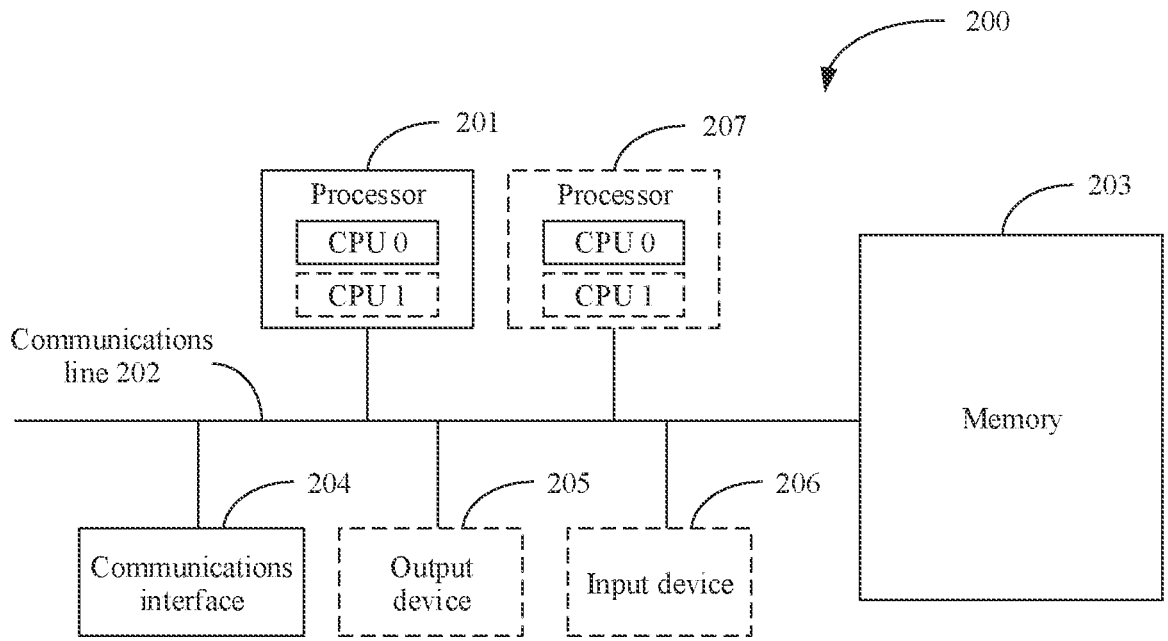
FIG. 2 is a schematic diagram of a hardware structure of a communications apparatus according to an embodiment of this application.

For example, each device in FIG. 1B may be implemented by using a hardware device 200 in FIG. 2. FIG. 2 is a schematic diagram of a hardware structure of the hardware device applicable to an embodiment of this application. The hardware device 200 may include at least one processor 201, a communications line 202, a memory 203, and at least one communications interface 204.

The processor 201 may be a general CPU, a microprocessor, an application-specific integrated circuit (ASIC), or one or more integrated circuits configured to control program execution of the solution of this application.

The communications line 202 may include a path such as a bus for transmitting information between the foregoing components.

The communications interface 204 is configured to communicate with another device or a communications network by using any apparatus such as a transceiver, and is, for example, an Ethernet interface, a radio access network (RAN) interface, or a wireless local area network (W LAN) interface.

The memory 203 may be a read-only memory (ROM) or another type of static storage device capable of storing static information and instructions, or a random access memory (RAM) or another type of dynamic storage device capable of storing information and instructions. Alternatively, the memory 203 may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited herein. The memory may exist independently, and is connected to the processor through the communications line 202. Alternatively, the memory may be integrated with the processor. The memory provided in embodiments of this application may be usually non-volatile. The memory 203 is configured to store computer-executable instructions for executing the solutions in this application, and execution is controlled by the processor 201. The processor 201 is configured to execute the computer-executable instructions stored in the memory 203, to implement the method provided in embodiments of this application.

Optionally, the computer-executable instructions in embodiments of this application may also be referred to as application program code. This is not specifically limited in embodiments of this application.

During specific implementation, in an embodiment, the processor 201 may include one or more CPUs, for example, a CPU 0 and a CPU 1 in FIG. 2.

During specific implementation, in an embodiment, the hardware device 200 may include a plurality of processors, for example, the processor 201 and a processor 207 in FIG. 2. Each of the processors may be a single-core (single-CPU) processor or a multi-core (multi-CPU) processor. Herein, the processor may be one or more devices, circuits, and/or processing cores configured to process data (for example, computer program instructions).

During specific implementation, in an embodiment, the hardware device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, or a projector. The input device 206 communicates with the processor 201, and may receive a user input in a plurality of manners. For example, the input device 206 may be a mouse, a keyboard, a touchscreen device, or a sensing device.

During specific implementation, the hardware device 200 may be an embedded device or a device having a structure similar to that in FIG. 2. A type of the hardware device 200 is not limited in embodiments of this application.

The following specifically describes the upgrade method in embodiments of this application with reference to FIG. 1A, FIG. 1B, and FIG. 2.

It should be noted that the upgrade method provided in embodiments of this application may be applied to a plurality of fields, for example, the unmanned driving field, the self-driving field, the assisted driving field, the smart driving field, the internet of vehicles field, the smart internet of vehicles field, and the vehicle sharing field.

It should be noted that names of messages between network elements, names of parameters in the messages, or the like in the following embodiments of this application are merely examples, and there may be other names during specific implementation. This is not specifically limited in embodiments of this application.

It should be noted that, in descriptions of this application, a word such as "first" or "second" is merely used for distinction and description, and shall not be understood as an indication or implication of relative importance or an indication or implication of an order. ECUs with different numbers such as "first ECU" in this application are merely used for contextual convenience, and different sequence numbers do not have specific technical meanings. For example, a first ECU and a second ECU may be understood as one or any one of a series of ECUs.

It may be understood that, in embodiments of this application, a server, a cloud, a T-Box, a gateway, or an ECU may perform some or all of steps in embodiments of this application, and these steps are merely examples. In embodiments of this application, other steps or various step variations may be further performed. In addition, the steps may be performed in a sequence different from a sequence presented in embodiments of this application, and not all steps in embodiments of this application need to be performed.

Figure 3:
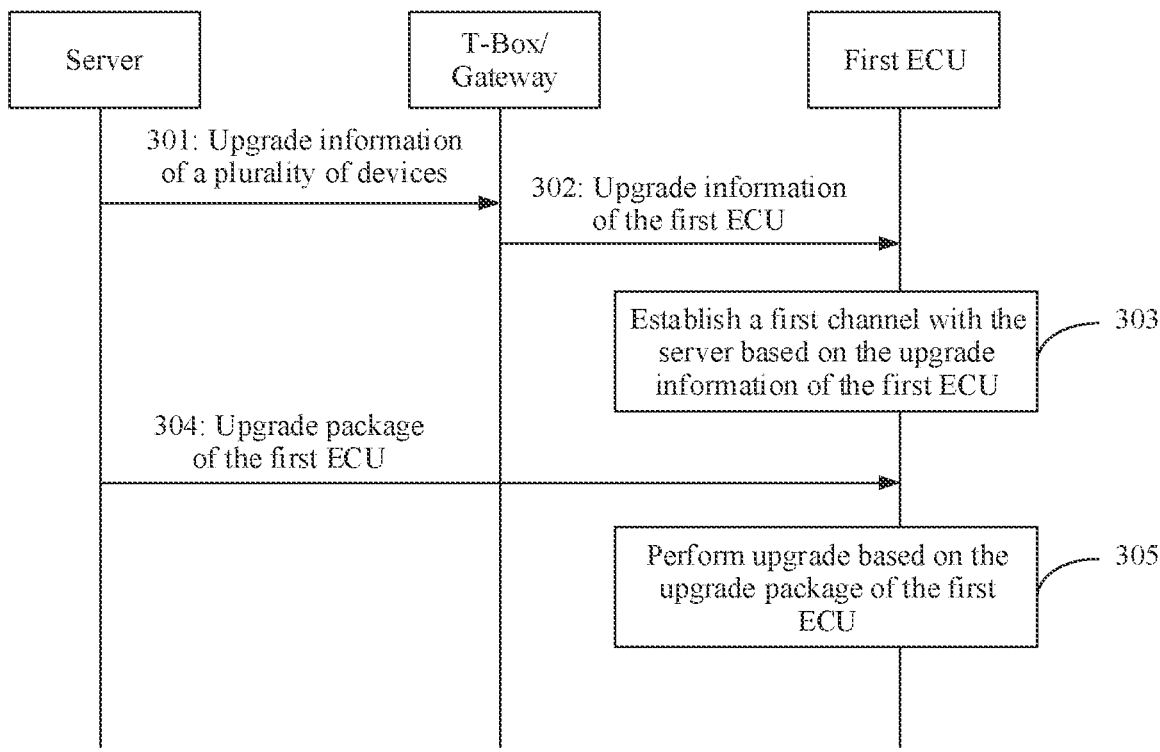
FIG. 3 is a schematic flowchart 1 of an upgrade method according to an embodiment of this application.

FIG. 3 shows an upgrade method according to an embodiment of this application. The upgrade method includes step 301 to step 305.

Step 301: A server sends upgrade information of a plurality of devices to a T-Box/gateway.

The server may be the server 20 in FIG. 1A, and the T-Box may be a T-Box in a vehicle. For example, the vehicle may be the vehicle 10 in FIG. 1A, and the T-Box may be the T-Box 101 in FIG. 1B. The gateway may be a gateway in a vehicle. For example, the vehicle may be the vehicle 10 in FIG. 1A, and the gateway may be the gateway 102 in FIG. 1B.

It should be noted that the server in embodiments of this application may be replaced with a cloud, and the cloud may be the cloud 30 in FIG. 1A.

The upgrade information of the plurality of devices may include upgrade information of one or more devices in internal devices of the vehicle.

In a possible implementation, the upgrade information of the plurality of devices may include upgrade information of a first ECU. The upgrade information of the first ECU may be used to indicate the server to establish a first channel with the first ECU.

The first ECU may be any one of the ECU 103 to the ECU 107 in FIG. 1B. The upgrade information of the first ECU may indicate an address or an identifier of the server.

It should be noted that the upgrade information of the plurality of devices may include upgrade information of one group of first ECUs, that is, the upgrade information of the plurality of devices may include upgrade information of two or more first ECUs. In embodiments of this application, an example in which the upgrade information of the plurality of devices includes the upgrade information of the first ECU is used for description. For a case in which the upgrade information of the plurality of devices includes upgrade information of one group of first ECUs, refer to the following description in which the upgrade information of the plurality of devices includes upgrade information of one first ECU. Details are not described.

In some embodiments, the upgrade information of the first ECU may include a download address of an upgrade package of the first ECU, and the download address of the upgrade package of the first ECU may indicate an address of the server. For example, the download address of the upgrade package of the first ECU is a uniform resource locator (URL) of the server.

In some embodiments, the upgrade information of the first ECU may include a download address of an upgrade package of the first ECU and an address of the server. For example, the download address of the upgrade package of the first ECU may be a URL of a resource server where the upgrade package of the first ECU is located. Subsequently, after the first ECU establishes the first channel with the server, the server may download the upgrade package of the first ECU from the resource server based on the download address of the upgrade package of the first ECU, and send the upgrade package of the first ECU to the first ECU.

In some embodiments, the upgrade information of the first ECU may include indication information, and the indication information may be used to indicate to upgrade the first ECU.

The indication information may include an identifier of the first ECU and an identifier of the server.

Further, in addition to the foregoing information, the upgrade information of the first ECU may further include at least one of the following information: a size of the upgrade package of the first ECU, a download policy of the upgrade package of the first ECU, an upgrade condition of the upgrade package of the first ECU, or an upgrade policy of the upgrade package of the first ECU.

The size of the upgrade package of the first ECU is used to indicate a quantity of bits occupied by the upgrade package of the first ECU. The download policy of the upgrade package of the first ECU is used to indicate a rule for downloading the upgrade package of the first ECU. The upgrade condition of the upgrade package of the first ECU is used to indicate a condition that needs to be met to perform upgrade by using the upgrade package of the first ECU. The upgrade policy of the upgrade package of the first ECU is used to indicate a rule for performing upgrade based on the upgrade package of the first ECU.

Optionally, the first ECU is an ECU whose upgrade package is relatively large and/or an ECU that is frequently upgraded. For example, the first ECU is an MDC or an HMI.

Optionally, before step 301, the server establishes a second channel with the T-Box/gateway.

The second channel may be a transport layer security (TLS) channel, a hypertext transfer protocol secure (HTTPs) secure channel, or a datagram transport layer security (DTLS) secure channel. The second channel may be used for communication between the T-Box/gateway and the server.

In some embodiments, the server may establish the second channel with the T-Box/gateway through a handshake. After successfully establishing the second channel, the server may perform encrypted communication with the T-Box/gateway.

An example in which the server establishes the second channel with the T-Box/gateway through four times of communication is used below to describe a process in which the server establishes the second channel with the T-Box/gateway through the handshake.

Optionally, that the server establishes a second channel with the T-Box/gateway includes: The server receives second request information from the T-Box/gateway, where the second request information is used to request to establish the second channel with the server. The server sends second request response information to the T-Box/gateway based on the second request information, where the second request response information is used to determine an encryption method for the server and the T-Box/gateway. The server receives second completion information from the T-Box/gateway, where the second completion information is used to indicate that establishment of the second channel between the server and the T-Box/gateway is completed. The server sends second completion response information to the T-Box/gateway based on the second completion information, where the second completion response information is used to indicate that establishment of the second channel between the server and the T-Box/gateway is completed.

The second request information may include an encrypted communications protocol version (for example, TLS 1.2) supported by the T-Box/gateway, a first random number, and an encryption method (for example, an asymmetric encryption algorithm (RSA) public-key encryption method) supported by the T-Box/gateway. The second request information may be referred to as a zClientHello request.

Optionally, the second request information may further include a compression method supported by the T-Box/gateway.

The second request response information may include a second random number, a certificate of the server, and an encrypted communications protocol version and an encryption method that the server determines to use. The second request response information may be referred to as Server-Hello information.

Optionally, the second request response information may include a compression method that the server determines to use.

It should be noted that, if encrypted communications protocol versions supported by the server and the T-Box/gateway are inconsistent, the server may disable encrypted communication. In other words, encryption is not performed when the server subsequently communicates with the T-Box/gateway.

Optionally, the second request response information may be further used to request a certificate of the T-Box/gateway.

The second completion information may include a third random number, a code change notification of the T-Box/gateway, and a handshake end notification of the T-Box/gateway. The code change notification of the T-Box/gateway may be used to indicate the T-Box/gateway to send, after sending the second completion information, the information by using the encryption method determined in the second request response information. The handshake end notification of the T-Box/gateway may be used to indicate that a handshake phase of the T-Box/gateway ends.

Optionally, the second completion information may alternatively be information obtained after the second request information, the third random number, the code change notification of the T-Box/gateway, and the handshake end notification of the T-Box/gateway are signed based on a digest function (for example, a hash function).

The second completion response information may include a code change notification of the server and a handshake end notification of the server. The code change notification of the server may be used to indicate the server to send, after sending the second completion response information, the information by using the encryption method determined in the second request response information. The handshake end notification of the server may be used to indicate that a handshake phase of the server ends.

Optionally, after receiving the second completion information, the server may generate a first session key based on the first random number, the second random number, the third random number, and the encryption method determined in the second request response information. Subsequently, the server may encrypt, by using the first session key, information sent to the T-Box/gateway, or the server may decrypt, by using the first session key, information sent by the T-Box/gateway.

Optionally, the server finds that there is a to-be-upgraded device in internal devices of the vehicle, and the server sends the upgrade information of the plurality of devices to the T-Box/gateway.

For example, in FIG. 1A and FIG. 1B, the server 20 receives indication information from an OEM system, and the indication information is used to indicate the server 20 to indicate the vehicle 10 to upgrade an internal device in the vehicle 10. The server 20 sends upgrade information of a plurality of devices to the T-Box 101/gateway 102.

Optionally, that a server sends upgrade information of a plurality of devices to a T-Box/gateway includes: The server signs the upgrade information of the plurality of devices, to obtain signed upgrade information of the plurality of devices. The server encrypts the signed upgrade information of the plurality of devices, to obtain encrypted upgrade information of the plurality of devices. The server sends the encrypted upgrade information of the plurality of devices to the T-Box/gateway.

That the server signs the upgrade information of the plurality of devices may include: The server performs layer-1 signature on the upgrade information of the plurality of devices, or the server performs layer-2 signature on the upgrade information of the plurality of devices.

Optionally, that the server performs layer-1 signature on the upgrade information of the plurality of devices includes: The server signs the upgrade information of the plurality of devices.

For example, the server performs layer-1 signature on the upgrade information of the plurality of devices. The server signs the upgrade information of the first ECU based on a first digest function (for example, a hash function), to obtain signed upgrade information of the first ECU. The server encrypts the signed upgrade information of the first ECU by using a first session key, to obtain encrypted upgrade information of the first ECU. The server sends the encrypted upgrade information of the first ECU to the T-Box/gateway.

Optionally, that the server performs layer-2 signature on the upgrade information of the plurality of devices includes: The server signs the upgrade information of each device in the upgrade information of the plurality of devices, to obtain signed upgrade information of the plurality of devices. The server signs the signed upgrade information of the plurality of devices.

For example, the server performs layer-2 signature on the upgrade information of the plurality of devices. The server signs the upgrade information of the first ECU based on a second digest function, to obtain first signature information. The server signs the first signature information based on a first digest function, to obtain second signature information. The server encrypts the second signature information by using a first session key, to obtain encrypted second signature information. The server sends the encrypted second signature information to the T-Box/gateway. The first digest function and the second digest function may be the same or different.

Step 302: The T-Box/gateway receives the upgrade information of the plurality of devices from the server, and sends the upgrade information of the first ECU to the first ECU based on the upgrade information of the first ECU.

Optionally, before the T-Box/gateway receives the upgrade information of the plurality of devices from the server, the T-Box/gateway establishes a second channel with the server.

The T-Box/gateway may establish the second channel with the server through a handshake. After successfully establishing the second channel, the T-Box/gateway may perform encrypted communication with the server.

An example in which the T-Box/gateway establishes the second channel with the server through four times of communication is used below to describe a process in which the T-Box/gateway establishes the second channel with the server through a handshake.

Optionally, that the T-Box/gateway establishes the second channel with the server includes: The T-Box/gateway sends second request information to the server, where the second request information is used to request to establish the second channel with the server. The T-Box/gateway receives second request response information from the server, where the second request response information is used to determine an encryption method for the server and the T-Box/gateway. The T-Box/gateway sends second completion information to the server, where the second completion information is used to indicate that establishment of the second channel between the server and the T-Box/gateway is completed. The T-Box/gateway receives second completion response information from the server, where the second completion response information is used to indicate that establishment of the second channel between the server and the T-Box/gateway is completed.

Optionally, after sending the second completion information, the T-Box/gateway may generate a first session key based on the first random number, the second random number, the third random number, and the encryption method determined in the second request response information. Subsequently, the T-Box/gateway may encrypt, by using the first session key, information sent to the server, or the T-Box/gateway may decrypt, by using the first session key, information sent by the server.

Optionally, that the T-Box/gateway sends the upgrade information of the first ECU to the first ECU based on the upgrade information of the first ECU includes: After successfully verifying the upgrade information of the plurality of devices, the T-Box/gateway sends the upgrade information of the first ECU to the first ECU based on the upgrade information of the first ECU.

For example, the server performs layer-1 signature on the upgrade information of the plurality of devices. The T-Box/gateway decrypts the upgrade information of the first ECU by using a first session key, to obtain decrypted upgrade information of the first ECU. The T-Box/gateway verifies the decrypted upgrade information of the first ECU based on a first digest function, and after the verification succeeds, sends the decrypted upgrade information of the first ECU to the first ECU.

For example, the server performs layer-2 signature on the upgrade information of the plurality of devices. The T-Box/gateway decrypts the upgrade information of the first ECU by using a first session key, to obtain decrypted upgrade information of the first ECU. The T-Box/gateway verifies the decrypted upgrade information of the first ECU based on a first digest function, and after the verification succeeds, sends the decrypted upgrade information of the first ECU to the first ECU.

In some embodiments, if the T-Box/gateway fails to verify the upgrade information of the plurality of devices, the T-Box/gateway sends verification failure information to the server, and the verification failure information is used to indicate that the T-Box/gateway fails to perform verification.

Step 303: The first ECU receives the upgrade information of the first ECU from the T-Box/gateway, and establishes the first channel with the server based on the upgrade information of the first ECU.

In some embodiments, if the upgrade information of the first ECU includes a download address of an upgrade package of the first ECU, and the download address of the upgrade package of the first ECU indicates an address of the server, the first ECU may determine the server based on the download address of the upgrade package of the first ECU, and establish the first channel with the server. Subsequently, the first ECU may send the download address of the upgrade package of the first ECU to the server, so that the server sends the upgrade package of the first ECU to the first ECU based on the download address of the upgrade package of the first ECU.

In some embodiments, if the upgrade information of the first ECU includes a download address of an upgrade package of the first ECU and an address of the server, the first ECU may determine the server based on the address of the server, and establish the first channel with the server. Subsequently, the first ECU may send the download address of the upgrade package of the first ECU to the server, so that the server sends the upgrade package of the first ECU to the first ECU based on the download address of the upgrade package of the first ECU.

In some embodiments, if the upgrade information of the first ECU includes indication information, and the indication information includes an identifier of the first ECU and an identifier of the server, the first ECU determines the server based on the identifier of the server, and establishes the first channel with the server. Subsequently, the first ECU may send the identifier of the first ECU to the server, so that the server sends the upgrade package of the first ECU to the first ECU based on the identifier of the first ECU.

Optionally, if the server performs layer-2 signature on the upgrade information of the plurality of devices, that the first ECU establishes the first channel with the server based on the upgrade information of the first ECU includes: After successfully verifying the upgrade information of the first ECU, the first ECU establishes the first channel with the server based on the upgrade information of the first ECU. For example, the first ECU verifies the upgrade information of the first ECU based on a second digest function, and after the verification succeeds, establishes the first channel with the server based on the upgrade information of the first ECU.

It should be noted that, if the server performs layer-2 signature on the upgrade information of the plurality of devices, the T-Box/gateway may also verify the upgrade information of the first ECU, and send the upgrade information of the first ECU to the first ECU after the verification succeeds. In this way, the first ECU may not need to verify the upgrade information of the first ECU.

Further optionally, if the first ECU fails to verify the upgrade information of the first ECU, the first ECU sends verification failure information to the server, and the verification failure information is used to indicate that the first ECU fails to perform verification.

The first channel may be a TLS channel, an HTTPS secure channel, a DTLS secure channel, or the like. The first channel may be used for communication between the first ECU and the server.

In some embodiments, the first ECU may establish the first channel with the server through a handshake. After successfully establishing the first channel, the first ECU may perform encrypted communication with the server.

An example in which the first ECU establishes the first channel with the server through four times of communication is used below to describe a process in which the first ECU establishes the first channel with the server through a handshake.

Optionally, that the first ECU establishes the first channel with the server includes: The first ECU sends first request information to the server, where the first request information is used to request to establish the first channel with the server. The first ECU receives first request response information from the server, where the first request response information is used to determine an encryption method for the server and the first ECU. The first ECU sends first completion information to the server, where the first completion information is used to indicate that establishment of the first channel between the first ECU and the server is completed. The first ECU receives first completion response information from the server, where the first completion response information is used to indicate that establishment of the first channel between the first ECU and the server is completed.

The first request information may include an encrypted communications protocol version (for example, TLS 1.2) supported by the first ECU, a fourth random number, and an encryption method (for example, an asymmetric encryption algorithm (RSA) public-key encryption method) supported by the first ECU. The first request information may be referred to as a ClientHello request.

Optionally, the first request information may further include a compression method supported by the first ECU.

The first request response information may include a fifth random number, a certificate of the server, and an encrypted communications protocol version and an encryption method that the server determines to use. The first request response information may be referred to as ServerHello information.

Optionally, the first request response information may include a compression method that the server determines to use.

It should be noted that, if encrypted communications protocol versions supported by the server and the first ECU are inconsistent, the server may disable encrypted communication. In other words, encryption is not performed when the server subsequently communicates with the first ECU.

Optionally, the first request response information may be further used to request a certificate of the first EC U.

The first completion information may include a sixth random number, a code change notification of the first ECU, and a handshake end notification of the first ECU. The code change notification of the first ECU may be used to indicate the first ECU to send, after sending the first completion information, the information by using the encryption method determined in the first request response information. The handshake end notification of the first ECU may be used to indicate that a handshake phase of the first ECU ends.

Optionally, the first completion information may alternatively be information obtained after the first request information, the sixth random number, the code change notification of the first ECU, and the handshake end notification of the first ECU are signed based on a digest function (for example, a hash function).

The first completion response information may include a code change notification of the server and a handshake end notification of the server. The code change notification of the server may be used to indicate the server to send, after sending the first completion response information, the information by using the encryption method determined in the first request response information. The handshake end notification of the server may be used to indicate that a handshake phase of the server ends.

Optionally, after receiving the first completion information, the server may generate a second session key based on the fourth random number, the fifth random number, the sixth random number, and the encryption method determined in the first request response information. Subsequently, the server may encrypt, by using the second session key, information sent to the first ECU, or the server may decrypt, by using the first session key, information sent by the first ECU.

It should be noted that, when the upgrade information of the plurality of devices includes upgrade information of one group of first ECUs, each first ECU may establish a first channel with the server based on upgrade information of the ECU.

Step 304: The server establishes the first channel with the first ECU, and sends the upgrade package of the first ECU to the first ECU through the first channel.

In some embodiments, the server may establish the first channel with the first ECU through a handshake. After successfully establishing the first channel, the server may perform encrypted communication with the first ECU.

An example in which the server establishes the first channel with the first ECU through four times of communication is used below to describe a process in which the server establishes the first channel with the first ECU through a handshake.

Optionally, that the server establishes the first channel with the first ECU includes: The server receives first request information from the first ECU, where the first request information is used to request to establish the first channel with the server. The server sends first request response information to the first ECU based on the first request information, where the first request response information is used to determine an encryption method for the server and the first ECU. The server receives first completion information from the first ECU, where the first completion information is used to indicate that establishment of the first channel between the first ECU and the server is completed. The server sends first completion response information to the first ECU based on the first completion information, where the first completion response information is used to indicate that establishment of the first channel between the first ECU and the server is completed.

It should be noted that, when the upgrade information of the plurality of devices includes upgrade information of one group of first ECUs, the server may establish a first channel with each first ECU, and send an upgrade package of an ECU corresponding to the first channel to the ECU through the first channel.

Optionally, that the server sends the upgrade package of the first ECU to the first ECU through the first channel includes: The server signs the upgrade package of the first ECU, to obtain a signed upgrade package of the first ECU. The server encrypts the signed upgrade package of the first ECU, to obtain an encrypted upgrade package of the first ECU. The server sends the encrypted upgrade package of the first ECU to the first ECU through the first channel.

For example, the server signs the upgrade package of the first ECU by using a first digest function. The server signs the upgrade package of the first ECU based on the first digest function, to obtain a signed upgrade package of the first ECU. The server encrypts the signed upgrade package of the first ECU by using a second session key, to obtain an encrypted upgrade package of the first ECU. The server sends the encrypted upgrade package of the first ECU to the first ECU through the first channel.

Step 305: The first ECU receives the upgrade package of the first ECU from the server through the first channel, and performs upgrade based on the upgrade package of the first ECU.

Optionally, that the first ECU performs upgrade based on the upgrade package of the first ECU includes: After verification on a signature of the upgrade package of the first ECU succeeds, the first ECU performs upgrade based on the upgrade package of the first ECU.

For example, the server signs the upgrade package of the first ECU by using a first digest function. The first ECU decrypts the upgrade package of the first ECU by using a second session key, to obtain a decrypted upgrade package of the first ECU. The first ECU verifies the decrypted upgrade package of the first ECU based on the first digest function, and after the verification succeeds, performs upgrade based on the upgrade package of the first ECU.

Optionally, that the first ECU performs upgrade based on the upgrade package of the first ECU includes: The first ECU installs the upgrade package of the first ECU.

Based on the method shown in FIG. 3, the server may send the upgrade information of the plurality of devices to the T-Box/gateway. The T-Box/gateway receives the upgrade information of the plurality of devices from the server, and sends the upgrade information of the first ECU to the first ECU based on the upgrade information of the first ECU. The first ECU receives the upgrade information of the first ECU from the T-Box/gateway, and establishes the first channel with the server based on the upgrade information of the first ECU. The server may send the upgrade package of the first ECU to the first ECU through the first channel. The first ECU receives the upgrade package of the first ECU from the server, and performs upgrade based on the upgrade package of the first ECU. In this way, the upgrade package of the first ECU may be not downloaded by the T-Box/gateway. This can improve upgrade efficiency and a download speed, and reduce a load and a storage requirement of the T-Box/gateway.

It should be noted that the upgrade information of the plurality of devices may further include upgrade information of a second ECU, and/or upgrade information of the gateway, and/or upgrade information of the T-Box. The T-Box/gateway may send upgrade information of a corresponding device to the device based on the upgrade information of the plurality of devices. After receiving the upgrade information of the device, the device may perform upgrade based on the upgrade information of the device.

An example in which the upgrade information of the plurality of devices includes the upgrade information of the second ECU is used below to describe the upgrade method provided in embodiments of this application. For a case in which the upgrade information of the plurality of devices includes the upgrade information of the gateway and/or the upgrade information of the T-Box, refer to a method shown in FIG. 4. Details are not described.

Figure 4:
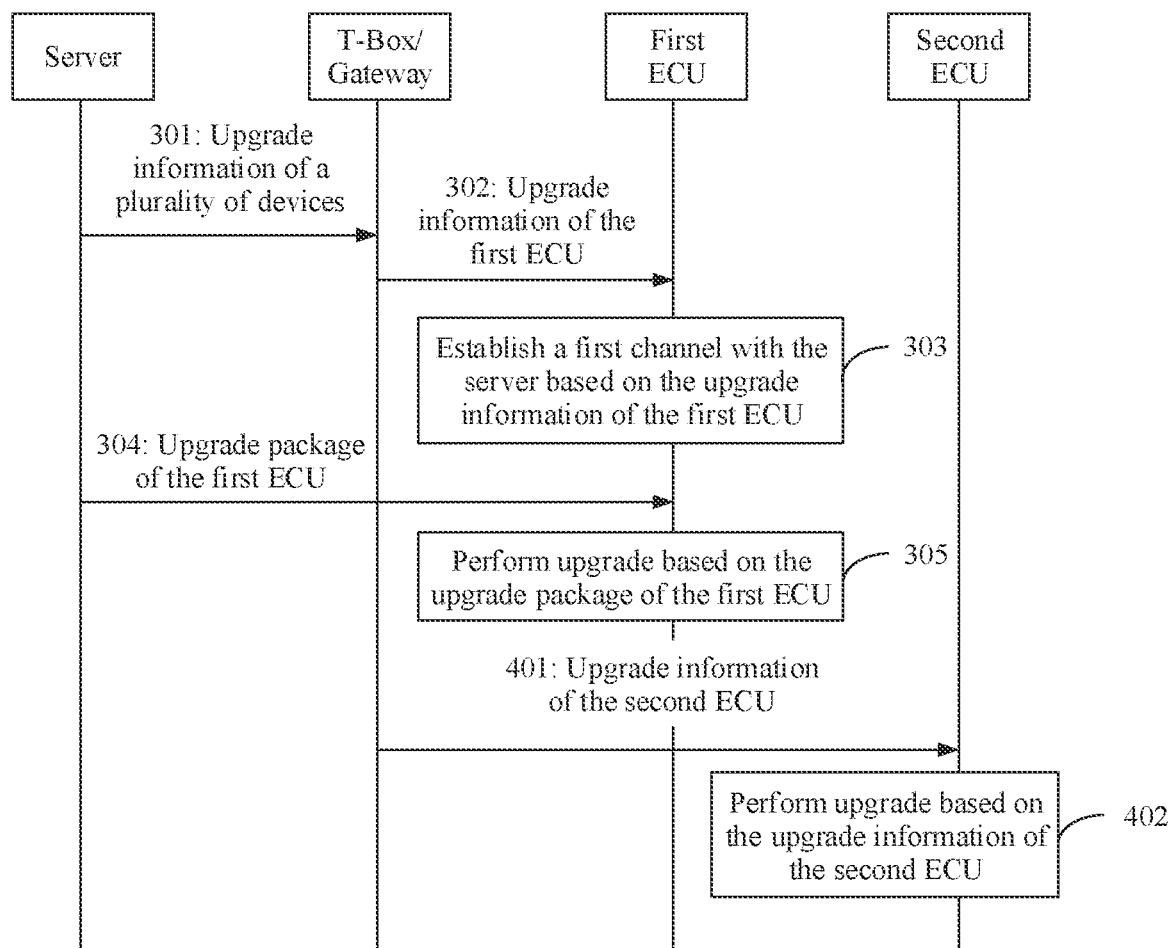
FIG. 4 is a schematic flowchart 2 of an upgrade method according to an embodiment of this application.

Further optionally, the upgrade information of the plurality of devices may further include the upgrade information of the second ECU. The T-Box/gateway may send the upgrade information of the second ECU to the second ECU based on the upgrade information of the second ECU, and the second ECU receives the upgrade information of the second ECU, and performs upgrade based on the upgrade information of the second ECU. For example, as shown in FIG. 4, the method shown in FIG. 3 further includes step 401 and step 402.

Step 401: A T-Box/gateway sends upgrade information of a second ECU to the second ECU.

The second ECU may be any one of the ECU 103 to the ECU 107 in FIG. 1B. The second ECU is different from the first ECU.

The upgrade information of the second ECU may include an upgrade package of the second ECU.

Optionally, the second ECU is an ECU whose upgrade package is relatively small and/or an ECU that is not frequently upgraded.

Step 402: The second ECU receives the upgrade information of the second ECU from the T-Box/gateway, and performs upgrade based on the upgrade information of the second ECU.

Optionally, that the second ECU performs upgrade based on the upgrade information of the second ECU includes: The second ECU installs the upgrade package of the second ECU.

It should be noted that an execution sequence of step 401 and step 402 and step 302 to step 305 is not limited in embodiments of this application. For example, in embodiments of this application, step 401 and step 402 may be performed before step 302 to step 305; or step 302 to step 305 may be performed before step 401 and step 402; or step 302 to step 305 and step 401 and step 402 may be simultaneously performed.

Based on the method shown in FIG. 4, when the upgrade information of the plurality of devices further includes the upgrade information of the second ECU, the T-Box/gateway may send the upgrade information of the second ECU to the second ECU, and the second ECU receives the upgrade information of the second ECU from the T-Box/gateway, and performs upgrade based on the upgrade information of the second ECU. In this way, the T-Box/gateway may further assist in upgrading the second ECU.

The following describes the upgrade method provided in embodiments of this application by using an example in which a T-Box has a capability of coordinating upgrades of internal devices in a vehicle, and upgrade information of a plurality of devices includes upgrade information of a first ECU and upgrade information of a second ECU.

Figure 5:
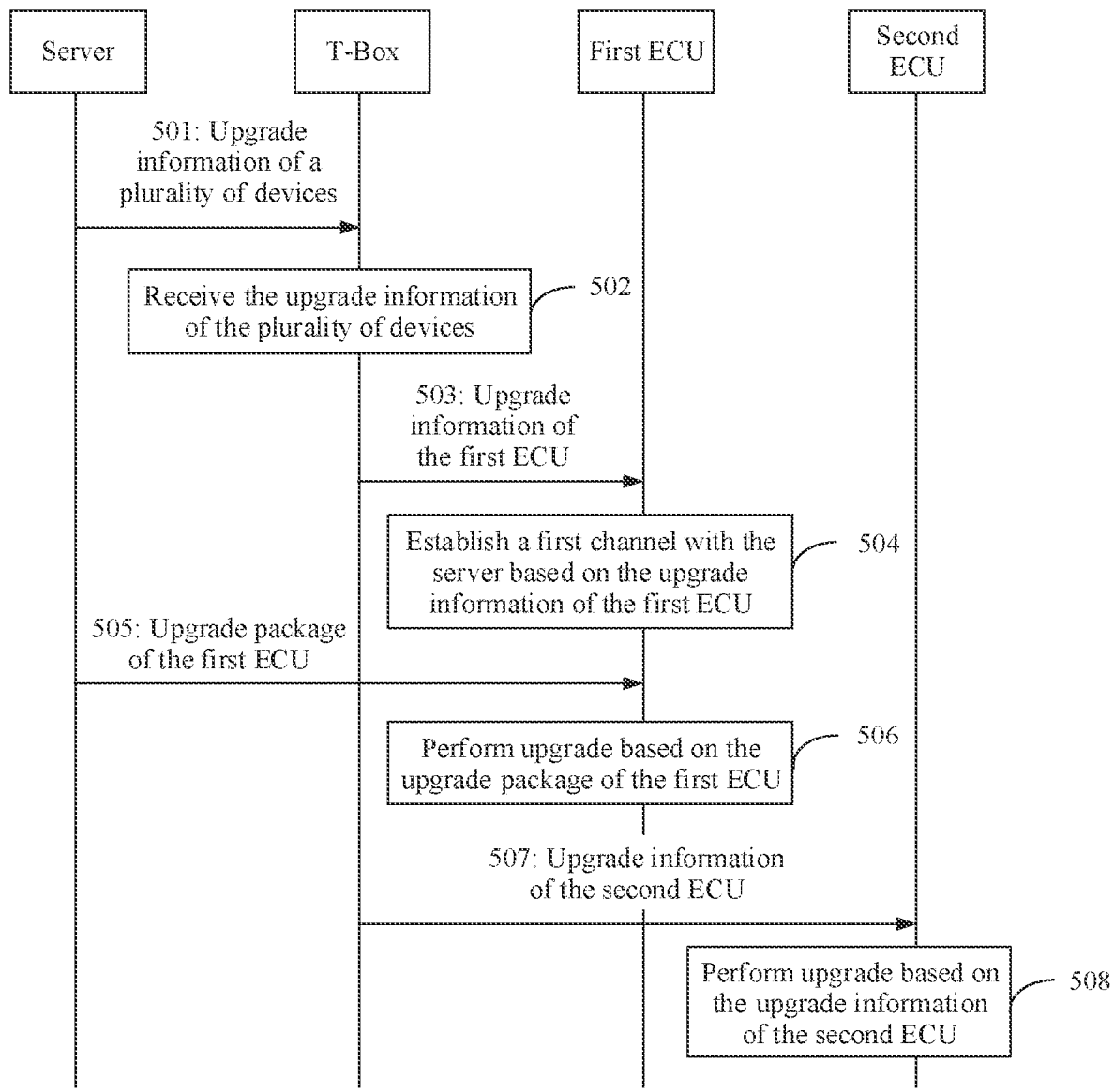
FIG. 5 is a schematic flowchart 3 of an upgrade method according to an embodiment of this application.

FIG. 5 shows an upgrade method according to an embodiment of this application. The upgrade method includes step 501 to step 508.

Step 501: A server sends upgrade information of a plurality of devices to a T-Box.

The server may be the server 20 in FIG. 1A, and the T-Box may be a T-Box in a vehicle. For example, the vehicle may be the vehicle 10 in FIG. 1A, and the T-Box may be the T-Box 101 in FIG. 1B.

It should be noted that the server in embodiments of this application may be replaced with a cloud, and the cloud may be the cloud 30 in FIG. 1A.

The upgrade information of the plurality of devices may include upgrade information of a first ECU and upgrade information of a second ECU. For descriptions of the first ECU and the upgrade information of the first ECU, refer to the descriptions of the first ECU and the upgrade information of the first ECU in the method shown in FIG. 3. Details are not described again. For descriptions of the second ECU and the upgrade information of the second ECU, refer to the descriptions of the second ECU and the upgrade information of the second ECU in the method shown in FIG. 4. Details are not described again.

Optionally, before step 501, the server establishes a second channel with the T-Box. For descriptions of establishing the second channel between the server and the T-Box, refer to the descriptions of establishing the second channel between the server and the T-Box/gateway in step 301. Details are not described again.

Optionally, the server finds that the first ECU and the second ECU need to be upgraded, and the server sends the upgrade information of the plurality of devices to the T-Box.

For example, in FIG. 1A and FIG. 1B, the server 20 receives indication information from an OEM system, and the indication information is used to indicate the server 20 to indicate to upgrade a first ECU and a second ECU. The server 20 sends upgrade information of a plurality of devices to the T-Box 101.

Optionally, that a server sends upgrade information of a plurality of devices to a T-Box includes: The server signs the upgrade information of the plurality of devices, to obtain signed upgrade information of the plurality of devices. The server encrypts the signed upgrade information of the plurality of devices, to obtain encrypted upgrade information of the plurality of devices. The server sends the encrypted upgrade information of the plurality of devices to the T-Box.

That the server signs the upgrade information of the plurality of devices may include: The server performs layer-1 signature on the upgrade information of the plurality of devices, or the server performs layer-2 signature on the upgrade information of the plurality of devices.

Optionally, that the server performs layer-1 signature on the upgrade information of the plurality of devices includes: The server signs the upgrade information of the plurality of devices.

For example, the server performs layer-1 signature on the upgrade information of the plurality of devices. The server signs the upgrade information of the first ECU and the upgrade information of the second ECU based on a first digest function (for example, a hash function), to obtain signed upgrade information of the first ECU and signed upgrade information of the second ECU. The server encrypts the signed upgrade information of the first ECU and the signed upgrade information of the second ECU by using a first session key, to obtain encrypted upgrade information of the first ECU and encrypted upgrade information of the second ECU. The server sends the encrypted upgrade information of the first ECU and the encrypted upgrade information of the second ECU to the T-Box.

Optionally, that the server performs layer-2 signature on the upgrade information of the plurality of devices includes: The server signs the upgrade information of each device in the upgrade information of the plurality of devices, to obtain signed upgrade information of the plurality of devices. The server signs the signed upgrade information of the plurality of devices.

For example, the server performs layer-2 signature on the upgrade information of the plurality of devices. The server signs the upgrade information of the first ECU based on a second digest function, to obtain first signature information. The server signs the upgrade information of the second ECU based on a third digest function, to obtain second signature information. The server signs the first signature information and the second signature information based on a first digest function, to obtain third signature information. The server encrypts the third signature information by using a first session key, to obtain encrypted third signature information. The server sends the encrypted third signature information to the T-Box. The first digest function, the second digest function, and the third digest function may be the same or may be different.

Step 502: The T-Box receives the upgrade information of the plurality of devices from the server.

Optionally, before the T-Box receives the upgrade information of the plurality of devices from the server, the T-Box establishes a second channel with the server. For descriptions of establishing the second channel between the T-Box and the server, refer to the descriptions of establishing the second channel between the T-Box/gateway and the server in step 302. Details are not described again.

Optionally, after receiving the upgrade information of the plurality of devices from the server, the T-Box may verify the upgrade information of the plurality of devices. If the verification succeeds, the T-Box sends the upgrade information corresponding to each of the plurality of devices to the device. If the verification fails, the T-Box sends verification failure information to the server, and the verification failure information is used to indicate that the verification of the T-Box fails.

For example, the server performs layer-1 signature on the upgrade information of the plurality of devices. The T-Box decrypts the upgrade information of the first ECU and the upgrade information of the second ECU, to obtain decrypted upgrade information of the first ECU and decrypted upgrade information of the second ECU. The T-Box verifies the decrypted upgrade information of the first ECU and the decrypted upgrade information of the second ECU based on a first digest function, and after the verification succeeds, sends the decrypted upgrade information of the first ECU to the first ECU, and sends the decrypted upgrade information of the second ECU to the second ECU.

For example, the server performs layer-2 signature on the upgrade information of the plurality of devices. The T-Box decrypts the upgrade information of the first ECU and the upgrade information of the second ECU, to obtain decrypted upgrade information of the first ECU and decrypted upgrade information of the second ECU. The T-Box verifies the decrypted upgrade information of the first ECU and the decrypted upgrade information of the second ECU based on a first digest function, and after the verification succeeds, sends the decrypted upgrade information of the first ECU to the first ECU. The T-Box verifies the decrypted upgrade information of the second ECU based on a third digest function, and if the decrypted upgrade information of the second ECU is successfully verified, sends the decrypted upgrade information of the second ECU to the second ECU.

Step 503: The T-Box sends the upgrade information of the first ECU to the first ECU based on the upgrade information of the first ECU.

Optionally, that the T-Box sends the upgrade information of the first ECU to the first ECU based on the upgrade information of the first ECU includes: The T-Box forwards (transparently transmits) the upgrade information of the first ECU to the first ECU through a gateway based on the upgrade information of the first ECU.

The gateway may be the gateway 102 in FIG. 1B.

Step 504: The first ECU receives the upgrade information of the first ECU from the T-Box, and establishes a first channel with the server based on the upgrade information of the first ECU.

Optionally, that the first ECU receives the upgrade information of the first ECU from the T-Box includes: The first ECU receives the upgrade information of the first ECU from the T-Box through the gateway.

For specific descriptions of establishing, by the first ECU, the first channel with the server based on the upgrade information of the first ECU, refer to the descriptions of step 303. Details are not described again.

Step 505: The server establishes the first channel with the first ECU, and sends the upgrade package of the first ECU to the first ECU through the first channel.

Step 506: The first ECU receives the upgrade package of the first ECU from the server through the first channel, and performs upgrade based on the upgrade package of the first ECU.

For specific descriptions of step 505 and step 506, refer to the descriptions of step 304 and step 305. Details are not described again.

Step 507: The T-Box sends the upgrade information of the second ECU to the second ECU.

Step 508: The second ECU receives the upgrade information of the second ECU from the T-Box. and performs upgrade based on the upgrade information of the second ECU.

For specific descriptions of step 507 and step 508, refer to the descriptions of step 401 and step 402. Details are not described again.

It should be noted that an execution sequence of step 503 to step 506 and step 507 and step 508 is not limited in embodiments of this application. For example, in embodiments of this application, step 503 to step 506 may be performed before step 507 and step 508; or step 507 and step 508 may be performed before step 503 to step 506; or step 503 to step 506 and step 507 and step 508 may be simultaneously performed.

Based on the method shown in FIG. 5, the server may send the upgrade information of the plurality of devices to the T-Box. The T-Box receives the upgrade information of the plurality of devices from the server, and sends the upgrade information of the first ECU to the first ECU based on the upgrade information of the first ECU. The first ECU receives the upgrade information of the first ECU from the T-Box, and establishes the first channel with the server based on the upgrade information of the first ECU. The server may send the upgrade package of the first ECU to the first ECU through the first channel. The first ECU receives the upgrade package of the first ECU from the server, and performs upgrade based on the upgrade package of the first ECU. The T-Box sends the upgrade information of the second ECU to the second ECU based on the upgrade information of the second ECU. The second ECU receives the upgrade information of the second ECU from the T-Box, and performs upgrade based on the upgrade information of the second ECU. In this way, the second ECU may download the upgrade package of the second ECU through the T-Box. and perform upgrade. However, the first ECU may not need to download the upgrade package of the first ECU through the T-Box. This improves upgrade efficiency and a download speed, and reduces a load and a storage requirement of the T-Box.

The following describes the upgrade method provided in embodiments of this application by using an example in which a gateway has a capability of coordinating upgrades of internal devices in a vehicle, and upgrade information of a plurality of devices includes upgrade information of a first ECU and upgrade information of a second ECU.

Figure 6:
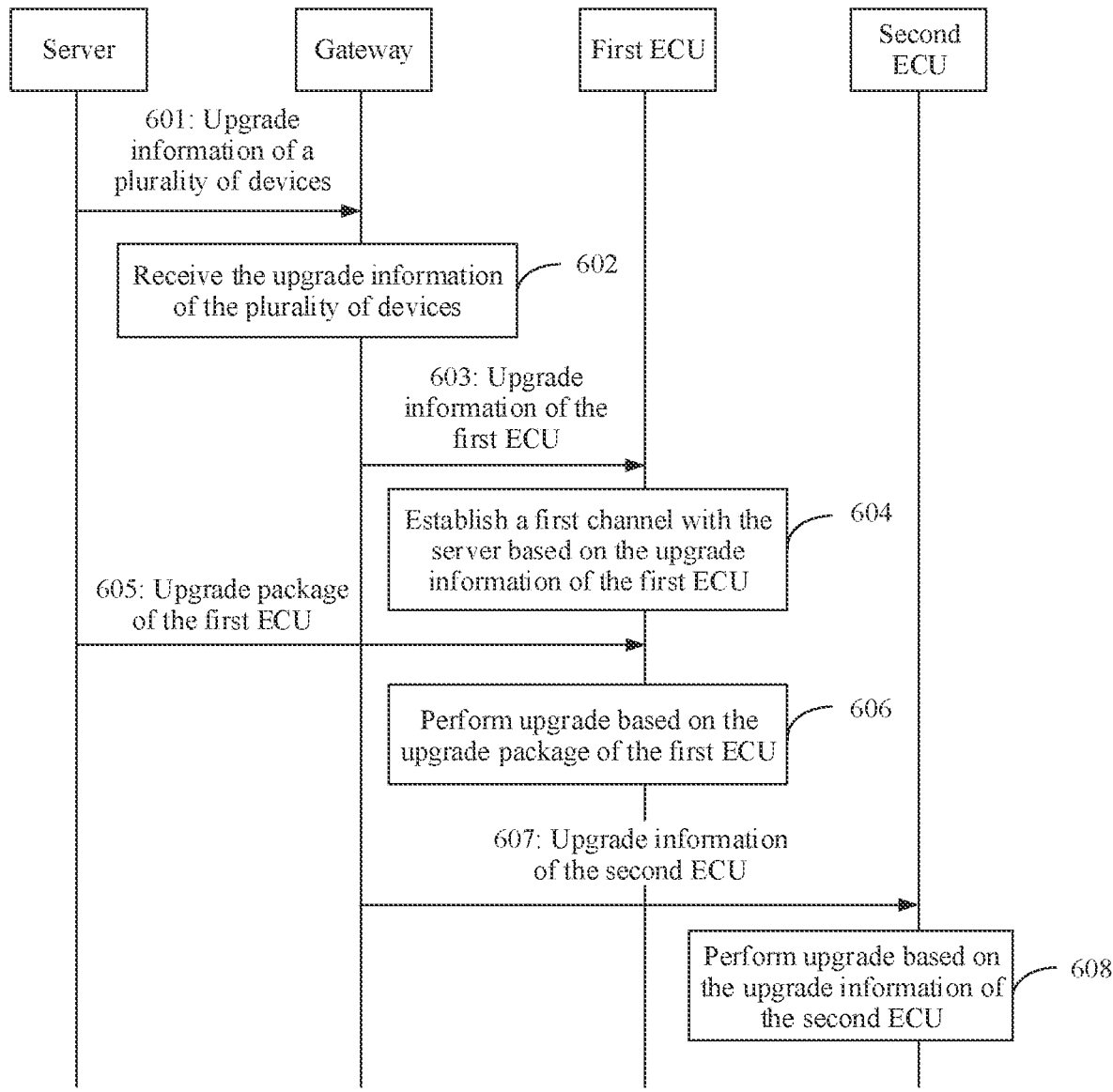
FIG. 6 is a schematic flowchart 4 of an upgrade method according to an embodiment of this application.

FIG. 6 shows an upgrade method according to an embodiment of this application. The upgrade method includes step 601 to step 608.

Step 601: A server sends upgrade information of a plurality of devices to a gateway.

The server may be the server 20 in FIG. 1A, and the gateway may be a gateway in a vehicle. For example, the vehicle may be the vehicle 10 in FIG. 1A, and the gateway may be the gateway 102 in FIG. 1B.

It should be noted that the server in embodiments of this application may be replaced with a cloud, and the cloud may be the cloud 30 in FIG. 1A.

The upgrade information of the plurality of devices may include upgrade information of a first ECU and upgrade information of a second ECU. For descriptions of the first ECU and the upgrade information of the first ECU, refer to the descriptions of the first ECU and the upgrade information of the first ECU in the method shown in FIG. 3. Details are not described again. For descriptions of the second ECU and the upgrade information of the second ECU, refer to the descriptions of the second ECU and the upgrade information of the second ECU in the method shown in FIG. 4. Details are not described again.

Optionally, that a server sends upgrade information of a plurality of devices to a gateway includes. The server sends the upgrade information of the plurality of devices to a T-Box. The T-Box receives the upgrade information of the plurality of devices from the server, and forwards (transparently transmits) the upgrade information of the plurality of devices to the gateway.

Optionally, before the server sends the upgrade information of the plurality of devices to the T-Box, the server establishes a second channel with the T-Box. For descriptions of establishing the second channel between the server and the T-Box, refer to the descriptions of establishing the second channel between the server and the T-Box/gateway in step 301. Details are not described again.

Optionally, before the T-Box receives the upgrade information of the plurality of devices from the server, the T-Box establishes a second channel with the server. For descriptions of establishing the second channel between the T-Box and the server, refer to the descriptions of establishing the second channel between the T-Box/gateway and the server in step 302. Details are not described again.

Optionally, the server finds that the first ECU and the second ECU need to be upgraded, and the server sends the upgrade information of the plurality of devices to the gateway.

For example, in FIG. 1A and FIG. 1B, the server 20 receives indication information from an OEM system, and the indication information is used to indicate the server 20 to indicate to upgrade a first ECU and a second ECU. The server 20 sends upgrade information of a plurality of devices to the gateway 102.

Optionally, that a server sends upgrade information of a plurality of devices to a gateway includes: The server signs the upgrade information of the plurality of devices, to obtain signed upgrade information of the plurality of devices. The server encrypts the signed upgrade information of the plurality of devices, to obtain encrypted upgrade information of the plurality of devices. The server sends the encrypted upgrade information of the plurality of devices to the gateway.

That the server signs the upgrade information of the plurality of devices may include: The server performs layer-1 signature on the upgrade information of the plurality of devices, or the server performs layer-2 signature on the upgrade information of the plurality of devices.

Optionally, that the server performs layer-1 signature on the upgrade information of the plurality of devices includes: The server signs the upgrade information of the plurality of devices.

For example, the server performs layer-1 signature on the upgrade information of the plurality of devices. The server signs the upgrade information of the first ECU and the upgrade information of the second ECU based on a first digest function (for example, a hash function), to obtain signed upgrade information of the first ECU and signed upgrade information of the second ECU. The server encrypts the signed upgrade information of the first ECU and the signed upgrade information of the second ECU by using a first session key, to obtain encrypted upgrade information of the first ECU and encrypted upgrade information of the second ECU. The server sends the encrypted upgrade information of the first ECU and the encrypted upgrade information of the second ECU to the gateway.

Optionally, that the server performs layer-2 signature on the upgrade information of the plurality of devices includes: The server signs the upgrade information of each device in the upgrade information of the plurality of devices, to obtain signed upgrade information of the plurality of devices. The server signs the signed upgrade information of the plurality of devices.

For example, the server performs layer-2 signature on the upgrade information of the plurality of devices. The server signs the upgrade information of the first ECU based on a second digest function, to obtain first signature information. The server signs the upgrade information of the second ECU based on a third digest function, to obtain second signature information. The server signs the first signature information and the second signature information based on a first digest function, to obtain third signature information. The server encrypts the third signature information by using a first session key, to obtain encrypted third signature information. The server sends the encrypted third signature information to the gateway. The first digest function, the second digest function, and the third digest function may be the same or may be different.

Step 602: The gateway receives the upgrade information of the plurality of devices from the server.

Optionally, that the gateway receives the upgrade information of the plurality of devices from the server includes: The gateway receives the upgrade information of the plurality of devices from the T-Box.

Optionally, after receiving the upgrade information of the plurality of devices from the server, the gateway may verify the upgrade information of the plurality of devices. If the verification succeeds, the gateway sends the upgrade information corresponding to each of the plurality of devices to the device. If the verification fails, the gateway sends verification failure information to the server, and the verification failure information is used to indicate that the verification of the gateway fails.

For example, the server performs layer-1 signature on the upgrade information of the plurality of devices. The gateway decrypts the upgrade information of the first ECU and the upgrade information of the second ECU, to obtain decrypted upgrade information of the first ECU and decrypted upgrade information of the second ECU. The gateway verifies the decrypted upgrade information of the first ECU and the decrypted upgrade information of the second ECU based on a first digest function, and after the verification succeeds, sends the decrypted upgrade information of the first ECU to the first ECU, and sends the decrypted upgrade information of the second ECU to the second ECU.

For example, the server performs layer-2 signature on the upgrade information of the plurality of devices. The gateway decrypts the upgrade information of the first ECU and the upgrade information of the second ECU, to obtain decrypted upgrade information of the first ECU and decrypted upgrade information of the second ECU. The gateway verifies the decrypted upgrade information of the first ECU and the decrypted upgrade information of the second ECU based on a first digest function, and after the verification succeeds, sends the decrypted upgrade information of the first ECU to the first ECU. The gateway verifies the decrypted upgrade information of the second ECU based on a third digest function, and if the decrypted upgrade information of the second ECU is successfully verified, sends the decrypted upgrade information of the second ECU to the second ECU.

Step 603: The gateway sends the upgrade information of the first ECU to the first ECU based on the upgrade information of the first ECU.

Step 604: The first ECU receives the upgrade information of the first ECU from the gateway, and establishes a first channel with the server based on the upgrade information of the first ECU.

For specific descriptions of step 604, refer to the descriptions of step 303. Details are not described again.

Step 605: The server establishes the first channel with the first ECU, and sends an upgrade package of the first ECU to the first ECU through the first channel.

Step 606: The first ECU receives the upgrade package of the first ECU from the server through the first channel, and performs upgrade based on the upgrade package of the first ECU.

For specific descriptions of step 605 and step 606, refer to the descriptions of step 304 and step 305. Details are not described again.

Step 607: The gateway sends the upgrade information of the second ECU to the second ECU.

Step 608: The second ECU receives the upgrade information of the second ECU from the gateway, and performs upgrade based on the upgrade information of the second ECU.

For specific descriptions of step 607 and step 608, refer to the descriptions of step 401 and step 402. Details are not described again.

It should be noted that an execution sequence of step 603 to step 606 and step 607 and step 608 is not limited in embodiments of this application. For example, in embodiments of this application, step 603 to step 606 may be performed before step 607 and step 608; or step 607 and step 608 may be performed before step 603 to step 606; or step 603 to step 606 and step 607 and step 608 may be simultaneously performed.

Based on the method shown in FIG. 6, the server may send the upgrade information of the plurality of devices to the gateway. The gateway receives the upgrade information of the plurality of devices from the server, and sends the upgrade information of the first ECU to the first ECU based on the upgrade information of the first ECU. The first ECU receives the upgrade information of the first ECU from the gateway, and establishes the first channel with the server based on the upgrade information of the first ECU. The server may send the upgrade package of the first ECU to the first ECU through the first channel. The first ECU receives the upgrade package of the first ECU from the server, and performs upgrade based on the upgrade package of the first ECU. The gateway sends the upgrade information of the second ECU to the second ECU based on the upgrade information of the second ECU. The second ECU receives the upgrade information of the second ECU from the gateway, and performs upgrade based on the upgrade information of the second ECU. In this way, the second ECU may download the upgrade package of the second ECU through the gateway, and perform upgrade. However, the first ECU may not need to download the upgrade package of the first ECU through the gateway. This improves upgrade efficiency and a download speed, and reduces a load and a storage requirement of the gateway.

The foregoing mainly describes, from a perspective of interaction between devices, the solutions provided in embodiments of this application. It can be understood that, to implement the foregoing functions, the server, the cloud, the T-Box, the gateway, the first ECU, or the like described above includes a corresponding hardware structure and/or software module for performing each of the functions. A person skilled in the art should be easily aware that, in combination with units and algorithm operations of the examples described in embodiments disclosed in this specification, this application can be implemented by hardware or a combination of hardware and computer software. Whether a function is implemented by hardware or hardware driven by computer software depends on a particular application and a design constraint of the technical solutions. A person skilled in the art may use different methods to implement the described functions for each particular application, but it should not be considered that the implementation goes beyond the scope of this application.

In embodiments of this application, function modules of the server, the cloud, the T-Box, the gateway, or the first ECU may be obtained through division based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in embodiments of this application, division into the modules is an example, and is merely logic function division. In actual implementation, another division manner may be used.

Figure 7:
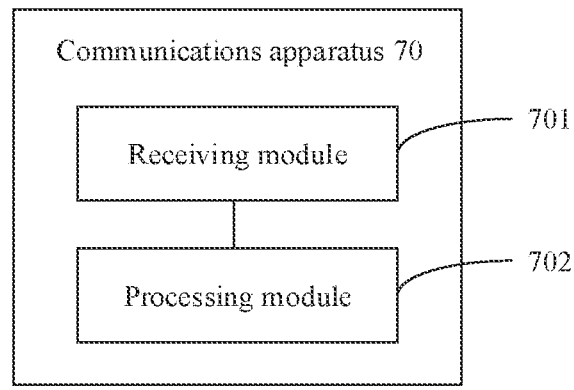
FIG. 7 is a schematic diagram 1 of a structure of a communications apparatus according to an embodiment of this application.

For example, when the function modules are obtained through division in an integrated manner, FIG. 7 is a schematic diagram of a structure of a communications apparatus 70. The communications apparatus 70 may be a chip or a system on chip in the first ECU, or another combined device, component, or the like that can implement a function of the first ECU. The communications apparatus 70 may be configured to implement the function of the first ECU in the foregoing embodiments.

In a possible implementation, the communications apparatus 70 shown in FIG. 7 includes a receiving module 701 and a processing module 702.

The receiving module 701 is configured to receive upgrade information of the communications apparatus 70 from a telematics box or a gateway.

The processing module 702 is configured to establish a first channel with a server based on the upgrade information of the communications apparatus 70.

The receiving module 701 is further configured to receive an upgrade package of the communications apparatus 70 from the server through the first channel.

The processing module 702 is further configured to perform upgrade based on the upgrade package of the communications apparatus 70.

Optionally, the first channel is a transport layer security channel, a hypertext transfer protocol secure secure channel, or a datagram transport layer security secure channel.

Optionally, the processing module 702 is specifically configured to send first request information to the server, where the first request information is used to request to establish the first channel with the server. The processing module 702 is further specifically configured to receive first request response information from the server, where the first request response information is used to determine an encryption method for the server and the first ECU. The processing module 702 is further specifically configured to send first completion information to the server, where the first completion information is used to indicate that establishment of the first channel between the communications apparatus 70 and the server is completed. The processing module 702 is further specifically configured to receive first completion response information from the server, where the first completion response information is used to indicate that establishment of the first channel between the communications apparatus 70 and the server is completed.

Optionally, the upgrade information of the communications apparatus 70 includes a download address of the upgrade package of the communications apparatus 70.

Optionally, the upgrade information of the communications apparatus 70 includes indication information, and the indication information is used to indicate to upgrade the communications apparatus 70.

Optionally, the processing module 702 is specifically configured to: after verification on a signature of the upgrade package of the first ECU succeeds, perform upgrade based on the upgrade package of the first ECU.

All related content of the operations in the foregoing method embodiments may be cited in function descriptions of the corresponding function modules. Details are not described herein again.

In embodiments, the communications apparatus 70 is presented in a form of function modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communications apparatus 70 may be in the form shown in FIG. 2.

For example, the processor 201 in FIG. 2 may invoke the computer-executable instructions stored in the memory 203, to enable the communications apparatus 70 to perform the upgrade method in the foregoing method embodiments.

For example, functions/implementation processes of the receiving module 701 and the processing module 702 in FIG. 7 may be implemented by the processor 201 in FIG. 2 by invoking the computer-executable instructions stored in the memory 203. Alternatively, functions/implementation processes of the processing module 702 in FIG. 7 may be implemented by the processor 201 in FIG. 2 by invoking the computer-executable instruction stored in the memory 203, and functions/implementation processes of the receiving module 701 in FIG. 7 may be implemented by the communications interface 204 in FIG. 2.

The communications apparatus 70 provided in embodiments may be configured to perform the foregoing upgrade method. Therefore, for technical effects that can be achieved by the communications apparatus, refer to the foregoing method embodiments. Details are not described herein again.

Figure 8:
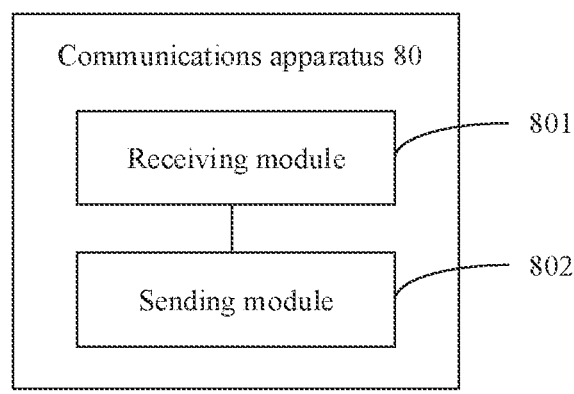
FIG. 8 is a schematic diagram 2 of a structure of a communications apparatus according to an embodiment of this application.

For example, when the function modules are obtained through division in an integrated manner, FIG. 8 is a schematic diagram of a structure of a communications apparatus 80. The communications apparatus 80 may be a chip or a system on chip in the T-Box/gateway, or another combined device, component, or the like that can implement a function of the T-Box/gateway. The communications apparatus 80 may be configured to implement the function of the T-Box/gateway in the foregoing embodiments.

In a possible implementation, the communications apparatus 80 shown in FIG. 8 includes a receiving module 801 and a sending module 802.

The receiving module 801 is configured to receive upgrade information of a plurality of devices from a server, where the upgrade information of the plurality of devices includes upgrade information of a first electronic control unit ECU, and the upgrade information of the first ECU is used to indicate the first ECU to establish a first channel with the server.

The sending module 802 is configured to send the upgrade information of the first ECU to the first ECU based on the upgrade information of the first ECU.

Optionally, the first channel is a transport layer security channel, a hypertext transfer protocol secure secure channel, or a datagram transport layer security secure channel.

Optionally, the upgrade information of the first ECU includes a download address of an upgrade package of the first ECU.

Optionally, the upgrade information of the first ECU includes indication information, and the indication information is used to indicate to upgrade the first ECU.

Optionally, the upgrade information of the plurality of devices further includes an upgrade package of a second ECU. The sending module 802 is further configured to send the upgrade package of the second ECU to the second ECU.

All related content of the operations in the foregoing method embodiments may be cited in function descriptions of the corresponding function modules. Details are not described herein again.

In embodiments, the communications apparatus 80 is presented in a form of function modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communications apparatus 80 may be in the form shown in FIG. 2.

For example, the processor 201 in FIG. 2 may invoke the computer-executable instructions stored in the memory 203, to enable the communications apparatus 80 to perform the upgrade method in the foregoing method embodiments.

For example, functions/implementation processes of the receiving module 801 and the sending module 802 in FIG. 8 may be implemented by the processor 201 in FIG. 2 by invoking the computer-executable instructions stored in the memory 203. Alternatively, functions/implementation processes of the receiving module 801 and the sending module 802 in FIG. 8 may be implemented by the communications interface 204 in FIG. 2.

The communications apparatus 80 provided in embodiments may be configured to perform the foregoing upgrade method. Therefore, for technical effects that can be achieved by the communications apparatus, refer to the foregoing method embodiments. Details are not described herein again.

Figure 9:
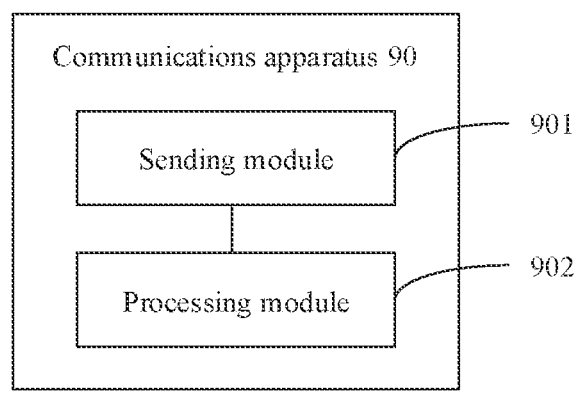
FIG. 9 is a schematic diagram 3 of a structure of a communications apparatus according to an embodiment of this application.

For example, when the function modules are obtained through division in an integrated manner, FIG. 9 is a schematic diagram of a structure of a communications apparatus 90. The communications apparatus 90 may be a chip or a system on chip in the server, or another combined device, component, or the like that can implement a function of the server. The communications apparatus 90 may be configured to implement the function of the server in the foregoing embodiments.

In a possible implementation, the communications apparatus 90 shown in FIG. 9 includes a sending module 901 and a processing module 902.

The sending module 901 is configured to send upgrade information of a plurality of devices to a telematics box or a gateway, where the upgrade information of the plurality of devices includes upgrade information of a first electronic control unit ECU.

The processing module 902 is configured to establish a first channel with the first ECU based on the upgrade information of the first ECU.

The sending module 901 is further configured to send an upgrade package of the first ECU to the first ECU through the first channel.

Optionally, the first channel is a transport layer security channel, a hypertext transfer protocol secure secure channel, or a datagram transport layer security secure channel.

Optionally, the processing module 902 is specifically configured to receive first request information from the first ECU, where the first request information is used to request to establish the first channel with the communications apparatus 90. The processing module 902 is further specifically configured to send first request response information to the first ECU based on the first request information, where the first request response information is used to determine an encryption method for the communications apparatus 90 and the first ECU. The processing module 902 is further specifically configured to receive first completion information from the first ECU, where the first completion information is used to indicate that establishment of the first channel between the first ECU and the communications apparatus 90 is completed. The processing module 902 is further specifically configured to send first completion response information to the first ECU based on the first completion information, where the first completion response information is used to indicate that establishment of the first channel between the first ECU and the communications apparatus 90 is completed.

Optionally, the upgrade information of the first ECU includes a download address of the upgrade package of the first ECU.

Optionally, the upgrade information of the first ECU includes indication information, and the indication information is used to indicate to upgrade the first ECU.

The processing module 902 is further configured to sign the upgrade package of the first ECU.

Optionally, the upgrade information of the plurality of devices further includes an upgrade package of a second ECU.

All related content of the operations in the foregoing method embodiments may be cited in function descriptions of the corresponding function modules. Details are not described herein again.

In embodiments, the communications apparatus 90 is presented in a form of function modules obtained through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communications apparatus 90 may be in the form shown in FIG. 2.

For example, the processor 201 in FIG. 2 may invoke the computer-executable instructions stored in the memory 203, to enable the communications apparatus 90 to perform the upgrade method in the foregoing method embodiments.

For example, functions/implementation processes of the sending module 901 and the processing module 902 in FIG. 9 may be implemented by the processor 201 in FIG. 2 by invoking the computer-executable instructions stored in the memory 203. Alternatively, functions/implementation processes of the processing module 902 in FIG. 9 may be implemented by the processor 201 in FIG. 2 by invoking the computer-executable instruction stored in the memory 203, and functions/implementation processes of the sending module 901 in FIG. 9 may be implemented by the communications interface 204 in FIG. 2.

The communications apparatus 90 provided in embodiments may be configured to perform the foregoing upgrade method. Therefore, for technical effects that can be achieved by the communications apparatus, refer to the foregoing method embodiments. Details are not described herein again.

Figure 10:
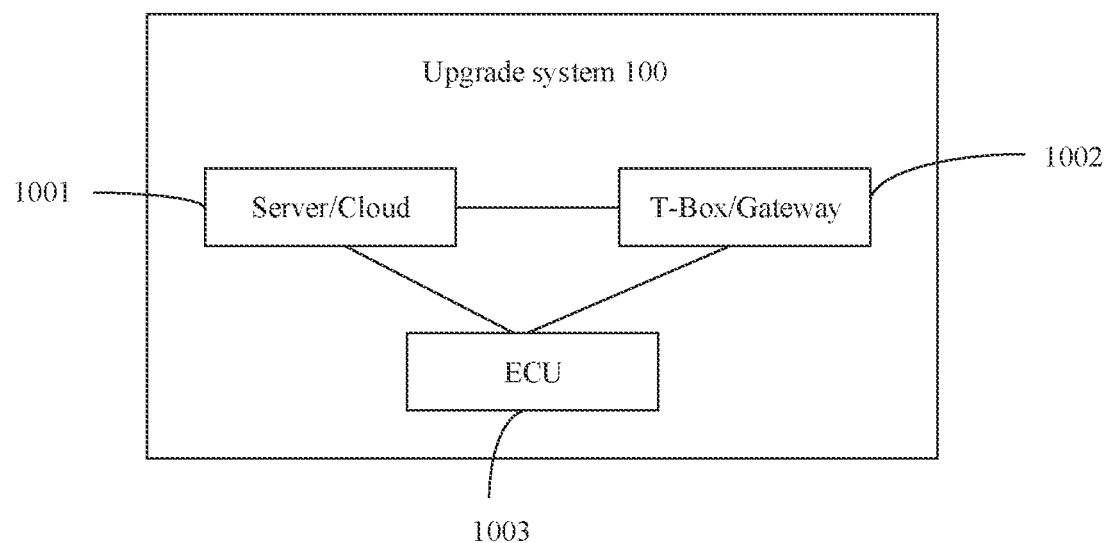
FIG. 10 is a schematic diagram of composition of an upgrade system according to an embodiment of this application.

FIG. 10 is a schematic diagram of composition of an upgrade system. As shown in FIG. 10, the upgrade system 100 may include a server/cloud 1001, a T-Box/gateway 1002, and an ECU 1003. It should be noted that FIG. 10 is merely an example of a diagram. Devices included in the upgrade system 100 shown in FIG. 10 and a quantity of device are not limited in embodiments of this application.

The server/cloud 1001 has a function of the communications apparatus 90 shown in FIG. 9. The server/cloud 1001 may send upgrade information of a plurality of devices to the T-Box/gateway 1002, establish a first channel with the ECU 1003 based on upgrade information of the ECU 1003, and send an upgrade package of the ECU 1003 to the ECU 1003 through the first channel.

The T-Box/gateway 1002 has a function of the communications apparatus 80 shown in FIG. 8. The T-Box/gateway 1002 may receive upgrade information of a plurality of devices from the server/cloud 1001, and send upgrade information of the ECU 1003 to the ECU 1003 based on the upgrade information of the ECU 1003.

The ECU 1003 has a function of the communications apparatus 70 shown in FIG. 7. The ECU 1003 may receive upgrade information of the ECU 1003 from the T-Box/gateway 1002, establish a first channel with the server/cloud 1001 based on the upgrade information of the ECU 1003, receive an upgrade package of the ECU 1003 from the server/cloud 1001 through the first channel, and perform upgrade based on the upgrade package of the ECU 1003.

It should be noted that all related content of the steps in the foregoing method embodiments may be cited in function descriptions of corresponding network elements of the upgrade system 100. Details are not described herein again.

All or some of the foregoing embodiments may be implemented by using software, hardware, firmware, or any combination thereof. When a software program is used to implement the foregoing embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to all the embodiments herein, in a process of implementing this application that claims protection, a person skilled in the art may understand and implement another variation of the disclosed embodiments by viewing the accompanying drawings, disclosed content, and the appended claims. In the claims, "comprising" does not exclude another component or another operation, and "a" or "one" does not exclude a case of "a plurality of". A single processor or another unit may implement several functions enumerated in the claims. Some measures are recorded in dependent claims that are different from each other, but this does not mean that these measures cannot be combined to produce a great effect.

Although this application is described with reference to specific features and all the embodiments thereof, it is clear that various modifications and combinations may be made to them without departing from the scope of this application. Correspondingly, this specification and the accompanying drawings are merely example description of this application defined by the appended claims, and are considered as any or all of modifications, variations, combinations or equivalents that cover the scope of this application. It is clear that a person skilled in the art can make various modifications and variations to this application without departing from the scope of this application. This application is intended to cover the modifications and variations of this application provided that they fall within the scope of the claims of this application and their equivalent technologies.

What is claimed is:

1. A first apparatus for upgrading, comprising at least one processor and at least one memory, wherein the at least one memory stores program instructions, and the at least one processor is coupled to the at least one memory to execute the program instructions to:

receive upgrade information of the first apparatus from an over the air (OTA) node, wherein the upgrade information of the first apparatus comprises a size of an upgrade package of the first apparatus, and at least one of a download policy of the upgrade package of the first apparatus, an upgrade condition of the upgrade package of the first apparatus, or an upgrade policy of the upgrade package of the first apparatus, and wherein the upgrade information of the first apparatus comprises an identifier of the first apparatus and an identifier of a server;

establish a first channel with the server based on the upgrade information of the first apparatus, wherein establishing the first channel with the server comprises:

sending first request information to the server, wherein the first request information comprises an encrypted communications protocol version supported by the first apparatus and a compression method supported by the first apparatus;

receiving first request response information from the server, wherein the first request response information comprises a certificate of the server, an encrypted communications protocol version to be used, and a compression method to be used;

sending first completion information to the server, wherein the first completion information comprises a code change notification; and receiving first completion response information from the server, wherein the first completion response information indicates that an establishment of the first channel between the first apparatus and the server is completed;

receive the upgrade package of the first apparatus from the server through the first channel; and perform upgrade of the first apparatus based on the upgrade package of the first apparatus.

2. The first apparatus according to claim 1, wherein the first channel is a transport layer security (TLS) channel, a hypertext transfer protocol secure (HTTPS) secure channel, or a datagram transport layer security (DTLS) secure channel.

3. The first apparatus according to claim 1, wherein the upgrade information of the first apparatus further comprises a download address of the upgrade package of the first apparatus.

4. The first apparatus according to claim 1, wherein the upgrade information of the first apparatus further comprises indication information, and wherein the indication information indicates to upgrade the first apparatus.

5. The first apparatus according to claim 1, wherein the first apparatus is an electronic control unit (ECU), a gateway, a domain controller, or a telematics box.

6. An upgrade apparatus, comprising at least one processor and at least one memory, wherein the at least one memory stores program instructions, and the at least one processor is coupled to the at least one memory to execute the program instructions to:

send request information to a server, wherein the request information comprises an encrypted communications protocol version supported by the upgrade apparatus and a compression method supported by the upgrade apparatus;

receive request response information from the server, wherein the request response information comprises a certificate of the server, an encrypted communications protocol version to be used, and a compression method to be used;

send completion information to the server, wherein the completion information comprises a code change notification;

receive completion response information from the server, wherein the completion response information indicates that an establishment of a secure channel between the upgrade apparatus and the server is completed;

receive, over the secure channel, upgrade information of a plurality of devices from the server, wherein the upgrade information of the plurality of devices comprises upgrade information of a first apparatus, wherein the upgrade information of the first apparatus indicates the first apparatus to establish a first channel with the server, wherein the upgrade information of the first apparatus comprises a size of an upgrade package of the first apparatus, and at least one of a download policy of the upgrade package of the first apparatus, an upgrade condition of the upgrade package of the first apparatus, or an upgrade policy of the upgrade package of the first apparatus, and wherein the upgrade information of the first apparatus comprises an identifier of the first apparatus and an identifier of the server;

send the upgrade information of the first apparatus to the first apparatus based on the upgrade information of the first apparatus; and send the upgrade package of the first apparatus to the first apparatus through the first channel.

7. The upgrade apparatus according to claim 6, wherein the first channel is a transport layer security (TLS) channel, a hypertext transfer protocol secure (HTTPS) secure channel, or a datagram transport layer security (DTLS) secure channel.

8. The upgrade apparatus according to claim 6, wherein the upgrade information of the first apparatus further comprises a download address of the upgrade package of the first apparatus.

9. The upgrade apparatus according to claim 6, wherein the upgrade information of the first apparatus further comprises indication information, and wherein the indication information indicates to upgrade the first apparatus.

10. The upgrade apparatus according to claim 6, wherein the upgrade information of the plurality of devices comprises upgrade information of a second apparatus, wherein the upgrade information of the second apparatus indicates the second apparatus to establish a second channel with the server, wherein the upgrade information of the second apparatus comprises a size of an upgrade package of the second apparatus, and wherein the at least one processor is coupled to the at least one memory to further execute the program instructions to:

send the upgrade information of the second apparatus to the second apparatus based on the upgrade information of the second apparatus; and send the upgrade package of the second apparatus to the second apparatus through the second channel.

11. The upgrade apparatus according to claim 10, wherein the second apparatus is different from the first apparatus, and wherein the second apparatus is an electronic control unit (ECU), a gateway, a domain controller, or a telematics box.

12. The upgrade apparatus according to claim 6, wherein the first apparatus is an electronic control unit (ECU), a gateway, a domain controller, or a telematics box.

13. An upgrade apparatus, comprising at least one processor and at least one memory, wherein the at least one memory is configured to store program instructions, and the at least one processor is coupled to the at least one memory to execute the program instructions to:

send upgrade information of a plurality of devices to an over the air (OTA) node, wherein the upgrade information of the plurality of devices comprises upgrade information of a first apparatus, wherein the upgrade information of the first apparatus comprises a size of an upgrade package of the first apparatus, and at least one of a download policy of the upgrade package of the first apparatus, an upgrade condition of the upgrade package of the first apparatus, or an upgrade policy of the upgrade package of the first apparatus, and wherein the upgrade information of the first apparatus comprises an identifier of the first apparatus and an identifier of the upgrade apparatus;

establish a first channel with the first apparatus based on the upgrade information of the first apparatus, wherein establishing the first channel with the first apparatus comprises:

receive receiving first request information from the first apparatus, wherein the first request information comprises an encrypted communications protocol version supported by the first apparatus and a compression method supported by the first apparatus;

sending first request response information to the first apparatus, wherein the first request response information comprises a certificate of the upgrade apparatus, an encrypted communications protocol version to be used, and a compression method to be used;

receiving first completion information from the first apparatus, wherein the first completion information comprises a code change notification; and sending first completion response information from the first apparatus, wherein the first completion response information indicates that an establishment of the first channel between the first apparatus and the upgrade apparatus is completed;

send the upgrade information of the first apparatus to the first apparatus based on the upgrade information of the first apparatus; and send the upgrade package of the first apparatus to the first apparatus through the first channel.

14. The upgrade apparatus according to claim 13, wherein the first channel is a transport layer security (TLS) channel, a hypertext transfer protocol secure (HTTPS) secure channel, or a datagram transport layer security (DTLS) secure channel.

15. The upgrade apparatus according to claim 13, wherein the upgrade information of the first apparatus further comprises a download address of the upgrade package of the first apparatus.

16. The upgrade apparatus according to claim 13, wherein the upgrade information of the first apparatus further comprises indication information, and wherein the indication information indicates to upgrade the first apparatus.

17. The upgrade apparatus according to claim 13, wherein the at least one processor is coupled to the at least one memory to further execute the program instructions to:
sign the upgrade package of the first apparatus.

18. The upgrade apparatus according to claim 13, wherein the upgrade information of the plurality of devices further comprises an upgrade package of a second apparatus.

19. The upgrade apparatus according to claim 18, wherein the second apparatus is different from the first apparatus, and wherein the second apparatus is an electronic control unit (ECU), a gateway, a domain controller, or a telematics box.

20. The upgrade apparatus according to claim 13, wherein the first apparatus is an electronic control unit (ECU), a gateway, a domain controller, or a telematics box.

21. A computer program product comprising computer-executable instructions that are stored on a non-transitory computer-readable storage medium and that, when executed by at least one processor of a first apparatus, cause the first apparatus for upgrading to:

receive upgrade information of the first apparatus from an over the air (OTA) node, wherein the upgrade information of the first apparatus comprises a size of an upgrade package of the first apparatus, and at least one of a download policy of the upgrade package of the first apparatus, an upgrade condition of the upgrade package of the first apparatus, or an upgrade policy of the upgrade package of the first apparatus, and wherein the upgrade information of the first apparatus comprises an identifier of the first apparatus and an identifier of a server;

establish a first channel with the server based on the upgrade information of the first apparatus, wherein establishing the first channel with the server comprises:

sending first request information to the server, wherein the first request information comprises an encrypted communications protocol version supported by the first apparatus and a compression method supported by the first apparatus;

receiving first request response information from the server, wherein the first request response information comprises a certificate of the server, an encrypted communications protocol version to be used, and a compression method to be used;

sending first completion information to the server, wherein the first completion information comprises a code change notification; and receiving first completion response information from the server, wherein the first completion response information indicates that an establishment of the first channel between the first apparatus and the server is completed;

receive the upgrade package of the first apparatus from the server through the first channel; and perform upgrade of the first apparatus based on the upgrade package of the first apparatus.

22. The computer program product according to claim 21, wherein the first channel is a transport layer security (TLS) channel, a hypertext transfer protocol secure HTTPS) secure channel, or a datagram transport layer security (DTLS) secure channel.

23. The computer program product according to claim 21, wherein the upgrade information of the first apparatus further comprises a download address of the upgrade package of the first apparatus.

24. The computer program product according to claim 21, wherein the upgrade information of the first apparatus further comprises indication information, and wherein the indication information indicates to upgrade the first apparatus.

25. The computer program product according to claim 21, wherein the first apparatus is an electronic control unit (ECU), a gateway, a domain controller, or a telematics box.

* * * * *